(12) United States Patent
Matta et al.

(10) Patent No.: US 8,514,827 B2
(45) Date of Patent: *Aug. 20, 2013

(54) SYSTEM AND NETWORK FOR WIRELESS NETWORK MONITORING

(75) Inventors: Sudheer Poorna Chandra Matta, Tracy, CA (US); Manish Tiwari, Pleasanton, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/396,124

(22) Filed: Feb. 14, 2012

(65) Prior Publication Data

US 2012/0140705 A1 Jun. 7, 2012

Related U.S. Application Data

(63) Continuation of application No. 12/785,362, filed on May 21, 2010, now Pat. No. 8,116,275, which is a continuation of application No. 11/331,789, filed on Jan. 14, 2006, now Pat. No. 7,724,703.

(60) Provisional application No. 60/727,025, filed on Oct. 13, 2005.

(51) Int. Cl.
*H04W 4/00* (2009.01)

(52) U.S. Cl.
USPC ....... 370/338; 370/329; 370/310.2; 455/41.2; 455/450

(58) Field of Classification Search
USPC ................ 455/434, 41.2; 370/328, 331, 338, 370/310.2, 315
See application file for complete search history.

(56) References Cited

U.S. PATENT DOCUMENTS

| | | | |
|---|---|---|---|
| 3,641,433 A | 2/1972 | Mifflin et al. | |
| 3,906,166 A | 9/1975 | Cooper et al. | |

(Continued)

FOREIGN PATENT DOCUMENTS

| | | | |
|---|---|---|---|
| EP | 0 992 921 A2 | 4/2000 | |
| EP | 1 542 409 A | 6/2005 | |

(Continued)

OTHER PUBLICATIONS

Acampora and Winters, "A Wireless Network for Wide-Band Indoor Communications," IEEE Journal on selected Areas in Communications, vol. SAC-5, No. 5, Jun. 1987, pp. 796-804.

(Continued)

*Primary Examiner* — Sharad Rampuria

(57) ABSTRACT

A technique for wireless network monitoring involves scanning channels using clients instead of access points. An example of a method according to the technique may include, for example, receiving from a wireless access point a command to perform a channel scanning function, listening on a channel associated with the channel scanning function, and sending RF data found on the channel to the wireless access point. Another example of a method according to the technique may include, for example, scanning a first channel, switching from the first channel to a second channel, sending data on the second channel to an access point, switching from the second channel to the first channel, and resuming scanning on the first channel. A system according to the technique may include one or more scanning clients, proxy clients, multi-channel clients, or other clients that are capable of scanning channels in lieu of an access point.

20 Claims, 10 Drawing Sheets

(56) References Cited

U.S. PATENT DOCUMENTS

| | | |
|---|---|---|
| 4,168,400 A | 9/1979 | De Couasnon et al. |
| 4,176,316 A | 11/1979 | DeRoas et al. |
| 4,247,908 A | 1/1981 | Lockhart et al. |
| 4,291,401 A | 9/1981 | Bachmann |
| 4,291,409 A | 9/1981 | Weinberg et al. |
| 4,409,470 A | 10/1983 | Shepard et al. |
| 4,460,120 A | 7/1984 | Shepard et al. |
| 4,475,208 A | 10/1984 | Ricketts |
| 4,494,238 A | 1/1985 | Groth, Jr. |
| 4,500,987 A | 2/1985 | Hasegawa |
| 4,503,533 A | 3/1985 | Tobagi et al. |
| 4,550,414 A | 10/1985 | Guinon et al. |
| 4,562,415 A | 12/1985 | McBiles |
| 4,630,264 A | 12/1986 | Wah |
| 4,635,221 A | 1/1987 | Kerr |
| 4,639,914 A | 1/1987 | Winters |
| 4,644,523 A | 2/1987 | Horwitz |
| 4,672,658 A | 6/1987 | Kavehrad |
| 4,673,805 A | 6/1987 | Shepard et al. |
| 4,707,839 A | 11/1987 | Andren et al. |
| 4,730,340 A | 3/1988 | Frazier |
| 4,736,095 A | 4/1988 | Shepard et al. |
| 4,740,792 A | 4/1988 | Sagey et al. |
| 4,758,717 A | 7/1988 | Shepard et al. |
| 4,760,586 A | 7/1988 | Takeda |
| 4,789,983 A | 12/1988 | Acampora et al. |
| 4,829,540 A | 5/1989 | Waggener, et al. |
| 4,850,009 A | 7/1989 | Zook et al. |
| 4,872,182 A | 10/1989 | Mcrae et al. |
| 4,894,842 A | 1/1990 | Broekhoven et al. |
| 4,901,307 A | 2/1990 | Gilhousen et al. |
| 4,933,952 A | 6/1990 | Albrieux et al. |
| 4,933,953 A | 6/1990 | Yagi |
| 4,955,053 A | 9/1990 | Siegmund |
| 4,995,053 A | 2/1991 | Simpson et al. |
| 5,008,899 A | 4/1991 | Yamamoto |
| 5,027,343 A | 6/1991 | Chan et al. |
| 5,029,183 A | 7/1991 | Tymes |
| 5,103,459 A | 4/1992 | Gilhousen et al. |
| 5,103,461 A | 4/1992 | Tymes |
| 5,109,390 A | 4/1992 | Gilhousen et al. |
| 5,119,502 A | 6/1992 | Kallin et al. |
| 5,142,550 A | 8/1992 | Tymes |
| 5,151,919 A | 9/1992 | Dent |
| 5,157,687 A | 10/1992 | Tymes |
| 5,187,575 A | 2/1993 | Lim |
| 5,231,633 A | 7/1993 | Hluchyj et al. |
| 5,280,498 A | 1/1994 | Tymes et al. |
| 5,285,494 A | 2/1994 | Sprecher et al. |
| 5,327,144 A | 7/1994 | Stilp et al. |
| 5,329,531 A | 7/1994 | Diepstraten |
| 5,339,316 A | 8/1994 | Diepstraten |
| 5,371,783 A | 12/1994 | Rose et al. |
| 5,418,812 A | 5/1995 | Reyes et al. |
| 5,432,842 A | 7/1995 | Kinoshita |
| 5,444,851 A | 8/1995 | Woest |
| 5,448,569 A | 9/1995 | Huang et al. |
| 5,450,615 A | 9/1995 | Fortune et al. |
| 5,465,401 A | 11/1995 | Thompson |
| 5,479,441 A | 12/1995 | Tymes et al. |
| 5,483,676 A | 1/1996 | Mahany et al. |
| 5,488,569 A | 1/1996 | Kaplan et al. |
| 5,491,644 A | 2/1996 | Pickering et al. |
| 5,517,495 A | 5/1996 | Lund |
| 5,519,762 A | 5/1996 | Bartlett |
| 5,528,621 A | 6/1996 | Heiman et al. |
| 5,542,100 A | 7/1996 | Hatakeyama |
| 5,546,389 A | 8/1996 | Wippenbeck et al. |
| 5,561,841 A | 10/1996 | Markus |
| 5,568,513 A | 10/1996 | Croft et al. |
| 5,570,366 A | 10/1996 | Baker et al. |
| 5,584,048 A | 12/1996 | Wieczorek |
| 5,598,532 A | 1/1997 | Liron |
| 5,630,207 A | 5/1997 | Gitlin et al. |
| 5,640,414 A | 6/1997 | Blakeney, et al. |
| 5,649,289 A | 7/1997 | Wang et al. |
| 5,668,803 A | 9/1997 | Tymes et al. |
| 5,670,964 A | 9/1997 | Dent |
| 5,677,954 A | 10/1997 | Hirata et al. |
| 5,706,428 A | 1/1998 | Boer et al. |
| 5,715,304 A | 2/1998 | Nishida et al. |
| 5,729,542 A | 3/1998 | Dupont |
| 5,734,699 A | 3/1998 | Lu et al. |
| 5,742,592 A | 4/1998 | Scholefield et al. |
| 5,774,460 A | 6/1998 | Schiffel et al. |
| 5,793,303 A | 8/1998 | Koga |
| 5,794,128 A | 8/1998 | Brockel et al. |
| 5,812,589 A | 9/1998 | Sealander et al. |
| 5,815,811 A | 9/1998 | Pinard et al. |
| 5,818,385 A | 10/1998 | Bartholomew |
| 5,828,653 A | 10/1998 | Goss |
| 5,828,960 A | 10/1998 | Tang et al. |
| 5,835,061 A | 11/1998 | Stewart |
| 5,838,907 A | 11/1998 | Hansen |
| 5,844,900 A | 12/1998 | Hong et al. |
| 5,852,722 A | 12/1998 | Hamilton |
| 5,862,475 A | 1/1999 | Zicker et al. |
| 5,872,968 A | 2/1999 | Knox et al. |
| 5,875,179 A | 2/1999 | Tikalsky |
| 5,887,259 A | 3/1999 | Zicker et al. |
| 5,896,561 A | 4/1999 | Schrader et al. |
| 5,909,686 A | 6/1999 | Muller et al. |
| 5,915,214 A | 6/1999 | Reece et al. |
| 5,920,821 A | 7/1999 | Seazholtz et al. |
| 5,933,607 A | 8/1999 | Tate et al. |
| 5,938,721 A | 8/1999 | Dussell et al. |
| 5,949,988 A | 9/1999 | Feisullin et al. |
| 5,953,669 A | 9/1999 | Stratis et al. |
| 5,960,335 A | 9/1999 | Umemoto et al. |
| 5,969,678 A | 10/1999 | Stewart |
| 5,970,066 A | 10/1999 | Lowry et al. |
| 5,977,913 A | 11/1999 | Christ |
| 5,980,078 A | 11/1999 | Krivoshein et al. |
| 5,982,779 A | 11/1999 | Krishnakumar et al. |
| 5,987,062 A | 11/1999 | Engwer et al. |
| 5,987,328 A | 11/1999 | Ephremides et al. |
| 5,991,817 A | 11/1999 | Rowett et al. |
| 5,999,813 A | 12/1999 | Lu et al. |
| 6,005,853 A | 12/1999 | Wang et al. |
| 6,011,784 A | 1/2000 | Brown |
| 6,012,088 A | 1/2000 | Li et al. |
| 6,029,196 A | 2/2000 | Lenz |
| 6,041,240 A | 3/2000 | McCarthy et al. |
| 6,041,358 A | 3/2000 | Huang et al. |
| 6,070,243 A | 5/2000 | See et al. |
| 6,073,075 A | 6/2000 | Kondou et al. |
| 6,073,152 A | 6/2000 | De Vries |
| 6,078,568 A | 6/2000 | Wright |
| 6,088,591 A | 7/2000 | Trompower et al. |
| 6,101,539 A | 8/2000 | Kennelly et al. |
| 6,115,390 A | 9/2000 | Chuah |
| 6,118,771 A | 9/2000 | Tajika et al. |
| 6,119,009 A | 9/2000 | Baranger et al. |
| 6,122,520 A | 9/2000 | Want et al. |
| 6,144,638 A | 11/2000 | Obenhuber et al. |
| 6,148,199 A | 11/2000 | Hoffman et al. |
| 6,154,776 A | 11/2000 | Martin |
| 6,160,804 A | 12/2000 | Ahmed et al. |
| 6,177,905 B1 | 1/2001 | Welch |
| 6,188,649 B1 | 2/2001 | Birukawa et al. |
| 6,199,032 B1 | 3/2001 | Anderson |
| 6,208,629 B1 | 3/2001 | Jaszewski et al. |
| 6,208,841 B1 | 3/2001 | Wallace et al. |
| 6,212,395 B1 | 4/2001 | Lu et al. |
| 6,218,930 B1 | 4/2001 | Katzenberg et al. |
| 6,240,078 B1 | 5/2001 | Kuhnel et al. |
| 6,240,083 B1 | 5/2001 | Wright |
| 6,240,291 B1 | 5/2001 | Narasimhan et al. |
| 6,246,751 B1 | 6/2001 | Bergl et al. |
| 6,249,252 B1 | 6/2001 | Dupray |
| 6,256,300 B1 | 7/2001 | Ahmed et al. |
| 6,256,334 B1 | 7/2001 | Adachi |
| 6,259,405 B1 | 7/2001 | Stewart et al. |
| 6,262,988 B1 | 7/2001 | Vig |

| Patent | Date | Inventor |
|---|---|---|
| 6,269,246 B1 | 7/2001 | Rao et al. |
| 6,285,662 B1 | 9/2001 | Watannabe |
| 6,304,596 B1 | 10/2001 | Yamano et al. |
| 6,304,906 B1 | 10/2001 | Bhatti et al. |
| 6,317,599 B1 | 11/2001 | Rappaport et al. |
| 6,326,918 B1 | 12/2001 | Stewart |
| 6,336,035 B1 | 1/2002 | Somoza et al. |
| 6,336,152 B1 | 1/2002 | Richman et al. |
| 6,347,091 B1 | 2/2002 | Wallentin et al. |
| 6,356,758 B1 | 3/2002 | Almeida et al. |
| 6,393,290 B1 | 5/2002 | Ufongene |
| 6,397,040 B1 | 5/2002 | Titmuss et al. |
| 6,404,772 B1 | 6/2002 | Beach et al. |
| 6,421,714 B1 | 7/2002 | Rai et al. |
| 6,429,879 B1 | 8/2002 | Sturgeon et al. |
| 6,446,206 B1 | 9/2002 | Feldbaum |
| 6,456,239 B1 | 9/2002 | Werb et al. |
| 6,470,025 B1 | 10/2002 | Wilson et al. |
| 6,473,449 B1 | 10/2002 | Cafarella et al. |
| 6,487,604 B1 | 11/2002 | Rochford et al. |
| 6,493,679 B1 | 12/2002 | Rappaport et al. |
| 6,496,290 B1 | 12/2002 | Lee |
| 6,512,916 B1 | 1/2003 | Forbes, Jr. |
| 6,526,275 B1 | 2/2003 | Calvert |
| 6,535,732 B1 | 3/2003 | McIntosh et al. |
| 6,564,380 B1 | 5/2003 | Murphy |
| 6,567,146 B2 | 5/2003 | Hirakata et al. |
| 6,567,416 B1 | 5/2003 | Chuah |
| 6,570,867 B1 | 5/2003 | Robinson et al. |
| 6,574,240 B1 | 6/2003 | Tzeng |
| 6,580,700 B1 | 6/2003 | Pinard et al. |
| 6,584,494 B1 * | 6/2003 | Manabe et al. ............... 709/204 |
| 6,587,680 B1 | 7/2003 | Ala-Laurila et al. |
| 6,587,835 B1 | 7/2003 | Treyz et al. |
| 6,603,970 B1 | 8/2003 | Huelamo Platas et al. |
| 6,614,787 B1 | 9/2003 | Jain et al. |
| 6,615,276 B1 | 9/2003 | Mastrianni et al. |
| 6,624,762 B1 | 9/2003 | End, III |
| 6,625,454 B1 | 9/2003 | Rappaport et al. |
| 6,631,267 B1 | 10/2003 | Clarkson et al. |
| 6,650,912 B2 | 11/2003 | Chen et al. |
| 6,658,389 B1 | 12/2003 | Alpdemir |
| 6,659,947 B1 | 12/2003 | Carter et al. |
| 6,661,787 B1 | 12/2003 | O'Connell et al. |
| 6,674,403 B2 | 1/2004 | Gray et al. |
| 6,677,894 B2 | 1/2004 | Sheynblat et al. |
| 6,678,516 B2 | 1/2004 | Nordman et al. |
| 6,678,802 B2 | 1/2004 | Hickson |
| 6,687,498 B2 | 2/2004 | McKenna et al. |
| 6,697,415 B1 | 2/2004 | Mahany |
| 6,721,334 B1 | 4/2004 | Ketcham |
| 6,721,548 B1 | 4/2004 | Mohindra et al. |
| 6,725,260 B1 | 4/2004 | Philyaw |
| 6,738,629 B1 | 5/2004 | McCormick et al. |
| 6,747,961 B1 | 6/2004 | Ahmed et al. |
| 6,756,940 B2 | 6/2004 | Oh et al. |
| 6,760,324 B1 | 7/2004 | Scott et al. |
| 6,785,275 B1 | 8/2004 | Boivie et al. |
| 6,788,938 B1 * | 9/2004 | Sugaya et al. ............ 455/435.1 |
| 6,798,788 B1 | 9/2004 | Viswanath et al. |
| 6,801,782 B2 | 10/2004 | McCrady et al. |
| 6,826,399 B1 | 11/2004 | Hoffman et al. |
| 6,839,338 B1 | 1/2005 | Amara et al. |
| 6,839,348 B2 | 1/2005 | Tang et al. |
| 6,839,388 B2 | 1/2005 | Vaidyanathan |
| 6,847,620 B1 | 1/2005 | Meier |
| 6,847,892 B2 | 1/2005 | Zhou et al. |
| 6,856,800 B1 | 2/2005 | Henry et al. |
| 6,865,609 B1 * | 3/2005 | Gubbi et al. ................ 709/230 |
| 6,879,812 B2 | 4/2005 | Agrawal et al. |
| 6,901,439 B1 | 5/2005 | Bonasia et al. |
| 6,917,688 B2 | 7/2005 | Yu et al. |
| 6,934,260 B1 | 8/2005 | Kanuri |
| 6,937,566 B1 | 8/2005 | Forslow |
| 6,938,079 B1 | 8/2005 | Anderson et al. |
| 6,957,067 B1 | 10/2005 | Iyer et al. |
| 6,973,622 B1 | 12/2005 | Rappaport et al. |
| 6,978,301 B2 | 12/2005 | Tindal |
| 6,980,533 B1 | 12/2005 | Abraham et al. |
| 6,985,469 B2 | 1/2006 | Leung |
| 6,985,697 B2 * | 1/2006 | Smith et al. .................. 455/41.2 |
| 6,990,348 B1 | 1/2006 | Benveniste |
| 6,993,683 B2 | 1/2006 | Bhat et al. |
| 6,996,630 B1 | 2/2006 | Masaki et al. |
| 7,013,157 B1 | 3/2006 | Norman et al. |
| 7,020,438 B2 | 3/2006 | Sinivaara et al. |
| 7,020,773 B1 | 3/2006 | Otway et al. |
| 7,024,199 B1 | 4/2006 | Massie et al. |
| 7,024,394 B1 | 4/2006 | Ashour et al. |
| 7,027,773 B1 | 4/2006 | McMillin |
| 7,031,705 B2 | 4/2006 | Grootwassink |
| 7,035,220 B1 | 4/2006 | Simcoe |
| 7,039,037 B2 | 5/2006 | Wang et al. |
| 7,058,414 B1 | 6/2006 | Rofheart et al. |
| 7,062,566 B2 | 6/2006 | Amara et al. |
| 7,068,999 B2 | 6/2006 | Ballai |
| 7,079,537 B1 | 7/2006 | Kanuri et al. |
| 7,089,322 B1 | 8/2006 | Stallmann |
| 7,092,529 B2 | 8/2006 | Yu et al. |
| 7,110,756 B2 | 9/2006 | Diener |
| 7,116,979 B2 | 10/2006 | Backes et al. |
| 7,126,913 B1 | 10/2006 | Patel et al. |
| 7,134,012 B2 | 11/2006 | Doyle et al. |
| 7,139,829 B2 | 11/2006 | Wenzel et al. |
| 7,142,867 B1 | 11/2006 | Gandhi et al. |
| 7,146,166 B2 | 12/2006 | Backes et al. |
| 7,155,236 B2 | 12/2006 | Chen et al. |
| 7,155,518 B2 | 12/2006 | Forslow |
| 7,158,777 B2 | 1/2007 | Lee et al. |
| 7,159,016 B2 | 1/2007 | Baker |
| 7,221,927 B2 | 5/2007 | Kolar et al. |
| 7,224,970 B2 | 5/2007 | Smith et al. |
| 7,239,862 B1 | 7/2007 | Clare et al. |
| 7,246,243 B2 | 7/2007 | Uchida |
| 7,263,366 B2 | 8/2007 | Miyashita |
| 7,274,730 B2 | 9/2007 | Nakabayashi |
| 7,280,495 B1 | 10/2007 | Zweig et al. |
| 7,290,051 B2 | 10/2007 | Dobric et al. |
| 7,293,136 B1 | 11/2007 | More et al. |
| 7,310,664 B1 | 12/2007 | Merchant et al. |
| 7,317,914 B2 | 1/2008 | Adya et al. |
| 7,320,070 B2 | 1/2008 | Baum |
| 7,324,468 B2 | 1/2008 | Fischer |
| 7,324,487 B2 | 1/2008 | Saito |
| 7,324,489 B1 | 1/2008 | Iyer et al. |
| 7,336,961 B1 | 2/2008 | Ngan |
| 7,349,412 B1 | 3/2008 | Jones et al. |
| 7,350,077 B2 | 3/2008 | Meier et al. |
| 7,359,676 B2 | 4/2008 | Hrastar |
| 7,370,362 B2 | 5/2008 | Olson et al. |
| 7,376,080 B1 | 5/2008 | Riddle et al. |
| 7,379,423 B1 | 5/2008 | Caves et al. |
| 7,382,756 B2 | 6/2008 | Barber et al. |
| 7,417,953 B2 | 8/2008 | Hicks et al. |
| 7,421,248 B1 | 9/2008 | Laux et al. |
| 7,421,487 B1 | 9/2008 | Peterson et al. |
| 7,440,416 B2 | 10/2008 | Mahany et al. |
| 7,443,823 B2 | 10/2008 | Hunkeler et al. |
| 7,447,502 B2 | 11/2008 | Buckley |
| 7,451,316 B2 | 11/2008 | Halasz et al. |
| 7,460,855 B2 | 12/2008 | Barkley et al. |
| 7,466,678 B2 | 12/2008 | Cromer et al. |
| 7,475,130 B2 | 1/2009 | Silverman |
| 7,477,894 B1 | 1/2009 | Sinha |
| 7,480,264 B1 | 1/2009 | Duo et al. |
| 7,483,390 B2 | 1/2009 | Rover et al. |
| 7,489,648 B2 | 2/2009 | Griswold |
| 7,493,407 B2 | 2/2009 | Leedom et al. |
| 7,505,434 B1 | 3/2009 | Backes |
| 7,509,096 B2 | 3/2009 | Palm et al. |
| 7,519,372 B2 | 4/2009 | MacDonald et al. |
| 7,529,925 B2 | 5/2009 | Harkins |
| 7,551,574 B1 | 6/2009 | Peden, II et al. |
| 7,551,619 B2 | 6/2009 | Tiwari |
| 7,558,266 B2 | 7/2009 | Hu |
| 7,570,656 B2 | 8/2009 | Raphaeli et al. |
| 7,573,859 B2 | 8/2009 | Taylor |
| 7,577,453 B2 | 8/2009 | Matta |

| | | |
|---|---|---|
| 7,592,906 B1 | 9/2009 | Hanna et al. |
| 7,603,119 B1 | 10/2009 | Durig et al. |
| 7,603,710 B2 | 10/2009 | Harvey et al. |
| 7,636,363 B2 | 12/2009 | Chang et al. |
| 7,665,132 B2 | 2/2010 | Hisada et al. |
| 7,680,501 B2 | 3/2010 | Sillasto et al. |
| 7,693,526 B2 | 4/2010 | Qian et al. |
| 7,706,749 B2 * | 4/2010 | Ritala ............... 455/41.2 |
| 7,715,432 B2 | 5/2010 | Bennett |
| 7,716,379 B2 | 5/2010 | Ruan et al. |
| 7,724,703 B2 * | 5/2010 | Matta et al. .......... 370/329 |
| 7,724,704 B2 | 5/2010 | Simons et al. |
| 7,729,278 B2 | 6/2010 | Chari et al. |
| 7,733,868 B2 | 6/2010 | Van Zijst |
| 7,738,433 B2 * | 6/2010 | Tao ................. 370/338 |
| 7,746,897 B2 | 6/2010 | Stephenson et al. |
| 7,788,475 B2 | 8/2010 | Zimmer et al. |
| 7,805,529 B2 | 9/2010 | Galluzzo et al. |
| 7,817,554 B2 | 10/2010 | Skog et al. |
| 7,844,298 B2 | 11/2010 | Riley |
| 7,856,659 B2 | 12/2010 | Keeler et al. |
| 7,865,713 B2 | 1/2011 | Chesnutt et al. |
| 7,873,061 B2 | 1/2011 | Gast et al. |
| 7,894,852 B2 | 2/2011 | Hansen |
| 7,912,982 B2 | 3/2011 | Murphy |
| 7,920,548 B2 | 4/2011 | Lor et al. |
| 7,929,922 B2 | 4/2011 | Kubo |
| 7,945,399 B2 | 5/2011 | Nosovitsky et al. |
| 7,986,940 B2 | 7/2011 | Lee et al. |
| 8,000,724 B1 | 8/2011 | Rayburn et al. |
| 8,014,404 B2 | 9/2011 | Eki et al. |
| 8,019,082 B1 | 9/2011 | Wiedmann et al. |
| 8,019,352 B2 | 9/2011 | Rappaport et al. |
| 8,116,275 B2 * | 2/2012 | Matta et al. ............. 370/329 |
| 8,140,845 B2 | 3/2012 | Buddhikot et al. |
| 8,150,357 B2 | 4/2012 | Aragon |
| 8,161,278 B2 | 4/2012 | Harkins |
| 8,190,750 B2 * | 5/2012 | Balachandran et al. ..... 709/228 |
| 8,238,942 B2 | 8/2012 | Gast |
| 8,270,384 B2 * | 9/2012 | Cheng et al. ............. 370/338 |
| 2001/0007567 A1 | 7/2001 | Ando et al. |
| 2001/0024953 A1 | 9/2001 | Balogh |
| 2002/0021701 A1 | 2/2002 | Lavian et al. |
| 2002/0052205 A1 | 5/2002 | Belostotsky et al. |
| 2002/0060995 A1 | 5/2002 | Cervello et al. |
| 2002/0062384 A1 | 5/2002 | Tso |
| 2002/0069278 A1 | 6/2002 | Forslow |
| 2002/0078361 A1 | 6/2002 | Giroux et al. |
| 2002/0080790 A1 | 6/2002 | Beshai |
| 2002/0082913 A1 | 6/2002 | Li |
| 2002/0087699 A1 | 7/2002 | Karagiannis et al. |
| 2002/0094824 A1 | 7/2002 | Kennedy et al. |
| 2002/0095486 A1 | 7/2002 | Bahl |
| 2002/0101868 A1 | 8/2002 | Clear et al. |
| 2002/0116655 A1 | 8/2002 | Lew et al. |
| 2002/0157020 A1 | 10/2002 | Royer |
| 2002/0174137 A1 | 11/2002 | Wolff et al. |
| 2002/0176437 A1 | 11/2002 | Busch et al. |
| 2002/0188756 A1 | 12/2002 | Weil et al. |
| 2002/0191572 A1 | 12/2002 | Weinstein et al. |
| 2002/0194251 A1 | 12/2002 | Richter et al. |
| 2003/0014646 A1 | 1/2003 | Buddhikot et al. |
| 2003/0018889 A1 | 1/2003 | Burnett et al. |
| 2003/0043073 A1 | 3/2003 | Gray et al. |
| 2003/0055959 A1 | 3/2003 | Sato |
| 2003/0107590 A1 | 6/2003 | Levillain et al. |
| 2003/0120764 A1 | 6/2003 | Laye et al. |
| 2003/0133450 A1 | 7/2003 | Baum |
| 2003/0134642 A1 | 7/2003 | Kostic et al. |
| 2003/0135762 A1 | 7/2003 | Macaulay |
| 2003/0145081 A1 | 7/2003 | Lau et al. |
| 2003/0156586 A1 | 8/2003 | Lee et al. |
| 2003/0174706 A1 | 9/2003 | Shankar et al. |
| 2003/0193910 A1 | 10/2003 | Shoaib et al. |
| 2003/0204596 A1 | 10/2003 | Yadav |
| 2003/0227934 A1 | 12/2003 | White et al. |
| 2004/0002343 A1 | 1/2004 | Brauel et al. |
| 2004/0003285 A1 | 1/2004 | Whelan et al. |
| 2004/0008652 A1 | 1/2004 | Tanzella et al. |
| 2004/0019857 A1 | 1/2004 | Teig et al. |
| 2004/0025044 A1 | 2/2004 | Day |
| 2004/0029580 A1 | 2/2004 | Haverinen et al. |
| 2004/0030777 A1 | 2/2004 | Reedy et al. |
| 2004/0030931 A1 | 2/2004 | Chamandy et al. |
| 2004/0038687 A1 | 2/2004 | Nelson |
| 2004/0044749 A1 | 3/2004 | Harkin |
| 2004/0047320 A1 | 3/2004 | Eglin |
| 2004/0049699 A1 | 3/2004 | Griffith et al. |
| 2004/0053632 A1 | 3/2004 | Nikkelen et al. |
| 2004/0054569 A1 | 3/2004 | Pombo et al. |
| 2004/0054774 A1 | 3/2004 | Barber et al. |
| 2004/0054926 A1 | 3/2004 | Ocepek et al. |
| 2004/0062267 A1 | 4/2004 | Minami et al. |
| 2004/0064560 A1 | 4/2004 | Zhang et al. |
| 2004/0064591 A1 | 4/2004 | Noble |
| 2004/0068668 A1 | 4/2004 | Lor et al. |
| 2004/0078598 A1 | 4/2004 | Barber et al. |
| 2004/0093506 A1 | 5/2004 | Grawrock et al. |
| 2004/0095914 A1 | 5/2004 | Katsube et al. |
| 2004/0095932 A1 | 5/2004 | Astarabadi et al. |
| 2004/0106403 A1 | 6/2004 | Mori et al. |
| 2004/0111640 A1 | 6/2004 | Baum |
| 2004/0114546 A1 | 6/2004 | Seshadri et al. |
| 2004/0119641 A1 | 6/2004 | Rapeli |
| 2004/0120370 A1 | 6/2004 | Lupo |
| 2004/0132438 A1 | 7/2004 | White |
| 2004/0143428 A1 | 7/2004 | Rappaport et al. |
| 2004/0143755 A1 | 7/2004 | Whitaker et al. |
| 2004/0165545 A1 | 8/2004 | Cook |
| 2004/0174900 A1 | 9/2004 | Volpi et al. |
| 2004/0184475 A1 | 9/2004 | Meier |
| 2004/0193709 A1 | 9/2004 | Selvaggi et al. |
| 2004/0208570 A1 | 10/2004 | Reader |
| 2004/0214572 A1 | 10/2004 | Thompson et al. |
| 2004/0221042 A1 | 11/2004 | Meier |
| 2004/0230370 A1 | 11/2004 | Tzamaloukas |
| 2004/0233234 A1 | 11/2004 | Chaudhry et al. |
| 2004/0236702 A1 | 11/2004 | Fink et al. |
| 2004/0246937 A1 | 12/2004 | Duong et al. |
| 2004/0246962 A1 | 12/2004 | Kopeikin et al. |
| 2004/0252656 A1 | 12/2004 | Shiu et al. |
| 2004/0255167 A1 | 12/2004 | Knight |
| 2004/0259552 A1 | 12/2004 | Ihori et al. |
| 2004/0259555 A1 | 12/2004 | Rappaport et al. |
| 2004/0259575 A1 | 12/2004 | Perez-Breva et al. |
| 2005/0015592 A1 | 1/2005 | Lin |
| 2005/0021979 A1 | 1/2005 | Wiedmann et al. |
| 2005/0025103 A1 | 2/2005 | Ko et al. |
| 2005/0025105 A1 | 2/2005 | Rue |
| 2005/0026611 A1 | 2/2005 | Backes |
| 2005/0030894 A1 | 2/2005 | Stephens |
| 2005/0030929 A1 | 2/2005 | Swier et al. |
| 2005/0037733 A1 | 2/2005 | Coleman et al. |
| 2005/0037818 A1 | 2/2005 | Seshadri et al. |
| 2005/0040968 A1 | 2/2005 | Damarla et al. |
| 2005/0054326 A1 | 3/2005 | Rogers |
| 2005/0054350 A1 | 3/2005 | Zegelin |
| 2005/0058132 A1 | 3/2005 | Okano et al. |
| 2005/0059405 A1 | 3/2005 | Thomson et al. |
| 2005/0059406 A1 | 3/2005 | Thomson et al. |
| 2005/0064873 A1 | 3/2005 | Karaoguz et al. |
| 2005/0068925 A1 | 3/2005 | Palm et al. |
| 2005/0073980 A1 | 4/2005 | Thomson et al. |
| 2005/0078644 A1 | 4/2005 | Tsai et al. |
| 2005/0097618 A1 | 5/2005 | Arling et al. |
| 2005/0114649 A1 | 5/2005 | Challener et al. |
| 2005/0120125 A1 | 6/2005 | Morten et al. |
| 2005/0122927 A1 | 6/2005 | Wentink |
| 2005/0122977 A1 | 6/2005 | Lieberman |
| 2005/0128142 A1 | 6/2005 | Shin et al. |
| 2005/0128989 A1 | 6/2005 | Bhagwat et al. |
| 2005/0144237 A1 | 6/2005 | Heredia et al. |
| 2005/0147032 A1 | 7/2005 | Lyon et al. |
| 2005/0157730 A1 | 7/2005 | Grant et al. |
| 2005/0159154 A1 | 7/2005 | Goren |
| 2005/0163078 A1 | 7/2005 | Oba et al. |
| 2005/0163146 A1 | 7/2005 | Ota et al. |
| 2005/0166072 A1 | 7/2005 | Converse et al. |

| | | | | | | |
|---|---|---|---|---|---|---|
| 2005/0175027 A1 | 8/2005 | Miller et al. | | 2007/0082677 A1 | 4/2007 | Hart et al. |
| 2005/0180345 A1 | 8/2005 | Meier | | 2007/0083924 A1 | 4/2007 | Lu |
| 2005/0180358 A1 | 8/2005 | Kolar et al. | | 2007/0086378 A1 | 4/2007 | Matta et al. |
| 2005/0181805 A1 | 8/2005 | Gallagher | | 2007/0086397 A1 | 4/2007 | Taylor |
| 2005/0193103 A1 | 9/2005 | Drabik | | 2007/0086398 A1 | 4/2007 | Tiwari |
| 2005/0207336 A1 | 9/2005 | Choi et al. | | 2007/0091845 A1 | 4/2007 | Brideglall |
| 2005/0213519 A1 | 9/2005 | Relan et al. | | 2007/0091889 A1 | 4/2007 | Xiao et al. |
| 2005/0220033 A1 | 10/2005 | DelRegno et al. | | 2007/0098086 A1 | 5/2007 | Bhaskaran |
| 2005/0223111 A1 | 10/2005 | Bhandaru et al. | | 2007/0104197 A1 | 5/2007 | King |
| 2005/0239461 A1 | 10/2005 | Verma et al. | | 2007/0106776 A1 | 5/2007 | Konno et al. |
| 2005/0240665 A1 | 10/2005 | Gu et al. | | 2007/0109991 A1 | 5/2007 | Bennett |
| 2005/0243737 A1 | 11/2005 | Dooley et al. | | 2007/0110035 A1 | 5/2007 | Bennett |
| 2005/0245258 A1 | 11/2005 | Classon et al. | | 2007/0115842 A1 | 5/2007 | Matsuda et al. |
| 2005/0245269 A1 | 11/2005 | Demirhan et al. | | 2007/0133494 A1 | 6/2007 | Lai et al. |
| 2005/0259597 A1 | 11/2005 | Benedetto et al. | | 2007/0135159 A1 | 6/2007 | Sinivaara |
| 2005/0259611 A1 | 11/2005 | Bhagwat et al. | | 2007/0135866 A1 | 6/2007 | Baker et al. |
| 2005/0268335 A1 | 12/2005 | Le et al. | | 2007/0136372 A1 | 6/2007 | Proctor et al. |
| 2005/0270992 A1 | 12/2005 | Sanzgiri et al. | | 2007/0140163 A1 | 6/2007 | Meier et al. |
| 2005/0273442 A1 | 12/2005 | Bennett et al. | | 2007/0143851 A1 | 6/2007 | Nicodemus et al. |
| 2005/0276218 A1 | 12/2005 | Ooghe et al. | | 2007/0147318 A1 | 6/2007 | Ross et al. |
| 2005/0286466 A1 | 12/2005 | Tagg et al. | | 2007/0150945 A1 | 6/2007 | Whitaker et al. |
| 2006/0030290 A1 | 2/2006 | Rudolf et al. | | 2007/0160046 A1 | 7/2007 | Matta |
| 2006/0035662 A1 | 2/2006 | Jeong et al. | | 2007/0171909 A1 | 7/2007 | Pignatelli |
| 2006/0039395 A1 | 2/2006 | Perez-Costa et al. | | 2007/0183375 A1 | 8/2007 | Tiwari |
| 2006/0041683 A1 | 2/2006 | Subramanian et al. | | 2007/0183402 A1 | 8/2007 | Bennett |
| 2006/0045050 A1 | 3/2006 | Floros et al. | | 2007/0189222 A1 | 8/2007 | Kolar et al. |
| 2006/0046744 A1 | 3/2006 | Dublish et al. | | 2007/0195793 A1 | 8/2007 | Grosser et al. |
| 2006/0050742 A1 | 3/2006 | Grandhi et al. | | 2007/0230457 A1 | 10/2007 | Kodera et al. |
| 2006/0064480 A1 | 3/2006 | Lesartre et al. | | 2007/0248009 A1 | 10/2007 | Petersen |
| 2006/0073847 A1 | 4/2006 | Pirzada et al. | | 2007/0253380 A1 | 11/2007 | Jollota et al. |
| 2006/0094440 A1 | 5/2006 | Meier et al. | | 2007/0255116 A1 | 11/2007 | Mehta et al. |
| 2006/0098607 A1 | 5/2006 | Zeng et al. | | 2007/0258448 A1 | 11/2007 | Hu |
| 2006/0104224 A1 | 5/2006 | Singh et al. | | 2007/0260720 A1 | 11/2007 | Morain |
| 2006/0114872 A1 | 6/2006 | Hamada | | 2007/0268506 A1 | 11/2007 | Zeldin |
| 2006/0114938 A1 | 6/2006 | Kalkunte et al. | | 2007/0268514 A1 | 11/2007 | Zeldin et al. |
| 2006/0117174 A1 | 6/2006 | Lee | | 2007/0268515 A1 | 11/2007 | Freund et al. |
| 2006/0128415 A1 | 6/2006 | Horikoshi et al. | | 2007/0268516 A1 | 11/2007 | Bugwadia et al. |
| 2006/0143496 A1 | 6/2006 | Silverman | | 2007/0286208 A1 | 12/2007 | Kanada et al. |
| 2006/0143702 A1 | 6/2006 | Hisada et al. | | 2007/0287390 A1 | 12/2007 | Murphy et al. |
| 2006/0152344 A1 | 7/2006 | Mowery | | 2007/0291689 A1 | 12/2007 | Kapur et al. |
| 2006/0160540 A1 | 7/2006 | Strutt et al. | | 2007/0297329 A1 | 12/2007 | Park et al. |
| 2006/0161983 A1 | 7/2006 | Cothrell et al. | | 2008/0002588 A1 | 1/2008 | McCaughan et al. |
| 2006/0165103 A1 | 7/2006 | Trudeau et al. | | 2008/0008117 A1 | 1/2008 | Alizadeh-Shabdiz |
| 2006/0168383 A1 | 7/2006 | Lin | | 2008/0013481 A1 | 1/2008 | Simons et al. |
| 2006/0173844 A1 | 8/2006 | Zhang et al. | | 2008/0014916 A1 | 1/2008 | Chen |
| 2006/0174336 A1 | 8/2006 | Chen | | 2008/0031257 A1 | 2/2008 | He |
| 2006/0178168 A1 | 8/2006 | Roach | | 2008/0039114 A1 | 2/2008 | Phatak et al. |
| 2006/0182118 A1 | 8/2006 | Lam et al. | | 2008/0049615 A1 | 2/2008 | Bugenhagen |
| 2006/0187878 A1 | 8/2006 | Calhoun et al. | | 2008/0052393 A1 | 2/2008 | McNaughton et al. |
| 2006/0189311 A1 | 8/2006 | Cromer et al. | | 2008/0056200 A1 | 3/2008 | Johnson |
| 2006/0190721 A1 | 8/2006 | Kawakami et al. | | 2008/0056211 A1 | 3/2008 | Kim et al. |
| 2006/0193258 A1 | 8/2006 | Ballai | | 2008/0064356 A1 | 3/2008 | Khayrallah |
| 2006/0200862 A1 | 9/2006 | Olson et al. | | 2008/0069018 A1 | 3/2008 | Gast |
| 2006/0206582 A1 | 9/2006 | Finn | | 2008/0080441 A1 | 4/2008 | Park et al. |
| 2006/0215601 A1 | 9/2006 | Vleugels et al. | | 2008/0102815 A1 | 5/2008 | Sengupta et al. |
| 2006/0217131 A1 | 9/2006 | Alizadeh-Shabdiz et al. | | 2008/0107077 A1 | 5/2008 | Murphy |
| 2006/0245393 A1 | 11/2006 | Bajic | | 2008/0114784 A1 | 5/2008 | Murphy |
| 2006/0248229 A1 | 11/2006 | Saunderson et al. | | 2008/0117822 A1 | 5/2008 | Murphy et al. |
| 2006/0248331 A1 | 11/2006 | Harkins | | 2008/0130523 A1 | 6/2008 | Fridman et al. |
| 2006/0268696 A1 | 11/2006 | Konstantinov et al. | | 2008/0151844 A1 | 6/2008 | Tiwari |
| 2006/0274774 A1 | 12/2006 | Srinivasan et al. | | 2008/0159319 A1 | 7/2008 | Gast et al. |
| 2006/0276192 A1 | 12/2006 | Dutta et al. | | 2008/0162921 A1 | 7/2008 | Chesnutt et al. |
| 2006/0285489 A1 | 12/2006 | Francisco et al. | | 2008/0220772 A1 | 9/2008 | Islam et al. |
| 2006/0292992 A1 | 12/2006 | Tajima et al. | | 2008/0226075 A1 | 9/2008 | Gast |
| 2007/0002833 A1 | 1/2007 | Bajic | | 2008/0228942 A1 | 9/2008 | Lor et al. |
| 2007/0008884 A1 | 1/2007 | Tang | | 2008/0250496 A1 | 10/2008 | Namihira |
| 2007/0010248 A1 | 1/2007 | Dravida et al. | | 2008/0261615 A1 | 10/2008 | Kalhan |
| 2007/0011318 A1 | 1/2007 | Roth | | 2008/0276303 A1 | 11/2008 | Gast |
| 2007/0025265 A1 | 2/2007 | Porras et al. | | 2009/0010206 A1 | 1/2009 | Giaretta et al. |
| 2007/0025306 A1 | 2/2007 | Cox et al. | | 2009/0028118 A1 | 1/2009 | Gray et al. |
| 2007/0027964 A1 | 2/2007 | Herrod et al. | | 2009/0031044 A1 | 1/2009 | Barrack et al. |
| 2007/0054616 A1 | 3/2007 | Culbert | | 2009/0046688 A1 | 2/2009 | Volpi et al. |
| 2007/0058598 A1 | 3/2007 | Ling | | 2009/0059930 A1 | 3/2009 | Ryan et al. |
| 2007/0064673 A1 | 3/2007 | Bhandaru et al. | | 2009/0067436 A1 | 3/2009 | Gast |
| 2007/0064718 A1 | 3/2007 | Ekl et al. | | 2009/0073905 A1 | 3/2009 | Gast |
| 2007/0067823 A1 | 3/2007 | Shim et al. | | 2009/0131082 A1 | 5/2009 | Gast |
| 2007/0070937 A1 | 3/2007 | Demirhan et al. | | 2009/0198999 A1 | 8/2009 | Harkins |
| 2007/0076694 A1 | 4/2007 | Iyer et al. | | 2009/0247103 A1 | 10/2009 | Aragon |
| 2007/0081477 A1 | 4/2007 | Jakkahalli et al. | | 2009/0252120 A1 | 10/2009 | Kim et al. |

| | | | |
|---|---|---|---|
| 2009/0257437 A1 | 10/2009 | Tiwari | |
| 2009/0260083 A1 | 10/2009 | Szeto et al. | |
| 2009/0274060 A1 | 11/2009 | Taylor | |
| 2009/0287816 A1 | 11/2009 | Matta et al. | |
| 2009/0293106 A1 | 11/2009 | Gray et al. | |
| 2010/0024007 A1 | 1/2010 | Gast | |
| 2010/0040059 A1 | 2/2010 | Hu | |
| 2010/0067379 A1 | 3/2010 | Zhao et al. | |
| 2010/0142478 A1 | 6/2010 | Forssell et al. | |
| 2010/0159827 A1 | 6/2010 | Rhodes et al. | |
| 2010/0180016 A1 | 7/2010 | Bugwadia et al. | |
| 2010/0261475 A1 | 10/2010 | Kim et al. | |
| 2010/0271188 A1 | 10/2010 | Nysen | |
| 2010/0329177 A1 | 12/2010 | Murphy et al. | |
| 2011/0128858 A1 | 6/2011 | Matta et al. | |
| 2011/0158122 A1 | 6/2011 | Murphy et al. | |
| 2011/0255466 A1 | 10/2011 | Gast et al. | |
| 2012/0144462 A1 | 6/2012 | Pochop | |
| 2012/0190320 A1 | 7/2012 | Aragon | |
| 2012/0190323 A1 | 7/2012 | Aragon | |
| 2012/0204031 A1 | 8/2012 | Harkins | |

FOREIGN PATENT DOCUMENTS

| | | |
|---|---|---|
| GB | 2 329 801 A | 3/1999 |
| GB | 2429080 A | 2/2007 |
| JP | 2000-215169 A1 | 8/2000 |
| JP | 2003-234751 A1 | 8/2003 |
| JP | 2003274454 | 9/2003 |
| JP | 2004-032525 A1 | 1/2004 |
| WO | WO 94/03986 | 2/1994 |
| WO | WO 99/11003 | 3/1999 |
| WO | WO 00/06271 A1 | 2/2000 |
| WO | WO 00/18148 | 3/2000 |
| WO | WO 02/089442 A1 | 11/2002 |
| WO | WO 03/085544 A1 | 10/2003 |
| WO | WO 2004/013986 A1 | 2/2004 |
| WO | WO 2004/095192 A2 | 11/2004 |
| WO | WO 2004/095800 A1 | 11/2004 |
| WO | WO 2006/014512 A2 | 2/2006 |
| WO | WO 2010/130133 A1 | 11/2010 |

OTHER PUBLICATIONS

Acampora and Winters, "System Applications for Wireless Indoor Communications" IEEE Communications Magazine, vol. 25, No. 8, Aug. 1987, pp. 11-20.

Bing and Subramanian, "A New Multiaccess Technique for Multimedia Wireless LANs" IEEE Global Telecommunications Conference, Nov. 3-8, 1997, pp. 1318-1322.

Durgin, et al., "Measurements and Models for Radio Path Loss and Penetration Loss in and Around Homes and Trees at 5.85 GHz", IEEE Transactions on Communications, vol. 46, No. 11, Nov. 1988, pp. 1484-1496.

Freret et al., Applications of Spread-Spectrum Radio to Wireless Terminal Communications, Conf. Record, Nat'l Telecom. Conf., Nov. 30-Dec. 4, IEEE, 1980, pp. 69.7.1-69.7.4.

Fortune et al., "Wise Design of Indoor Wireless Systems: Practical Computation and Optimization", IEEE Computational Science and Engineering, p. 58-68 (1995).

Geier, Jim. Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.

Ho et al., "Antenna Effects on Indoor Obstructed Wireless Channels and a Deterministic Image-Based Wide-Based Propagation Model for In-Building Personal Communications Systems", International Journal of Wireless Information Networks, vol. 1, No. 1, 1994.

Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.

Kleinrock and Scholl, "Packet Switching in Radio Channels: New Conflict-Free Multiple Access Schemes for a Small Number of Data Users", Conference record 1977 ICC vol. 2 of 3, Jun. 12-15 Chicago Illinois (1977).

LAN/MAN Standards Committee of the IEEE Computer Society, Part 11:Wireless LAN Medium Access Control (MAC) and Physical Layer (PHY) Specifications:Higher Speed Physical Layer Extension in the 2.4 GHz Band, IEEE Std. 802.11b (1999).

Okamoto and Xu, IEEE, "Multimedia Communications over Wireless LANs via the SWL Protocol" Proceedings of the 13th Annual Hawaii International Conference on System Sciences, pp. 54-63 (1997).

Panjwani et al., "Interactive Computation of Coverage Regions for Wireless Communication in Multifloored Indoor Environments", IEEE Journal on Selected Areas in Communications, vol. 14, No. 3, Apr. 1996.

Perram and Martinez, "Technology Developments for Low-Cost Residential Alarm Systems", Proceedings 1997, Carnahan Conference on Crime Countermeasures, Apr. 6-8, pp. 45-50 (1977).

Piazzi et al., "Achievable Accuracy of Site-Specific Path-Loss Predictions in Residential Environments", IEEE Transactions on Vehicular Technology, vol. 48, No. 3, May 1999.

Seidel et al., "Site-Specific Propagation Prediction for Wireless In-Building Personal Communications System Design", IEEE Transactions on Vehicular Technology, vol. 43, No. 4, Nov. 1994.

Skidmore et al., "Interactive Coverage Region and System Design Simulation for Wireless Communication Systems in Multi-floored Indoor Environments, SMT Plus" IEEE ICUPC '96 Proceedings (1996).

Ullmo et al., "Wireless Propagation in Buildings: A Statistic Scattering Approach", IEEE Transactions on Vehicular Technology, vol. 48, No. 3, May 1999.

Puttini, R., Percher, J., Me, L., and de Sousa, R. 2004. A fully distributed IDS for MANET. In *Proceedings of the Ninth international Symposium on Computers and Communications 2004 vol. 2 (Iscc''04)*—vol. 02 (Jun. 28-Jul. 1, 2004). ISCC. IEEE Computer Society, Washington, DC, 331-338.

P. Martinez, M. Brunner, J. Quittek, F. Straus, J. Schonwlder, S. Mertens, T. Klie "Using the Script MIB for Policy-based Configuration Management", Technical University Braunschweig, Braunschweig, Germany, 2002.

Law, A., "New Service Discovery Protocol," Internet Citation [Online] XP002292473 Retrieved from the Internet: <URL: http://sern.uccalgary.ca~lawa/SENG60921/arch/SDP.htm> [retrieved Aug. 12, 2004] (15 pages).

P. Bahl et al., RADAR: An In-Building RF-based User Location and Tracking System, Microsoft Research, Mar. 2000, 10 pages.

Latvala J. et al., Evaluation of RSSI-Based Human Tracking, Proceedings for the 2000 European Signal Processing Conference, Sep. 2000, 9 pages.

Bahl P. et al. "User Location and Tracking in an In-Building Radio Network," Microsoft Research, Feb. 1999, 13 pages.

P. Bahl et al., A Software System for Locating Mobile Users: Design, Evaluation, and Lessons, Microsoft Research, Feb. 1999, 13 pages.

Chen, Yen-Chen et al., "Enabling Location-Based Services on Wireless LANs", Networks, 2003. ICON2003. The 11th IEEE International Conference, Sep. 28-Oct. 1, 2003, pp. 567-572.

Erten, Y. Murat, "A Layered Security Architecture for Corporate 802.11 Wireless Networks", Wireless Telecommunications Symposium, May 14-15, 2004, pp. 123-128.

Kleine-Ostmann, T., et al., "A Data Fusion Architecture for Enhanced Position Estimation in Wireless Networks," IEEE Communications Letters , vol. 5(8), Aug. 2001, p. 343-345.

Pulson, Time Domain Corporation, Ultra wideband (UWB) Radios for Precision Location, Third IEEE Workshop on Wireless Local Area Networks, Sep. 27-28, 2001, 8 pages.

Barber, S., Monitoring 802.1 Networks, IEEE 802.11, Sydney, NSW, May 13-17, 2002.

Latvala, J. et al. "Patient Tracking in a Hospital Environment Using Extended Kalman-filtering," Proceedings of the 1999 Middle East Conference on Networking, Nov. 1999, 5 pages.

Myllymaki, P. et al., "A Probabilistic Approach to WLAN User Location Estimation," Third IEEE Workshop on Wireless Local Area Networks, Sep. 27-28, 2001, 12 pages.

Potter, B., and Fleck, B., 802.11 Security, O'Reilly Media Inc., Dec. 2002, 14 pages.

McCann, S., et al., "Emergency Services for 802," IEEE 802.11-07/0505r1, Mar. 2007, 27 pages.

Di Sorte, D., et al., "On the Performance of Service Publishing in IEEE 802.11 Multi-Access Environment," IEEE Communications Letters, vol. II, No. 4, Apr. 2007, 3 pages.

Microsoft Computer Dictionary, Fifth Edition, Microsoft Corporation, 2002, 2 pages.

Thomson, Allan, Cisco Systems, AP Power Down Notification, Power Point slide show; IEEE standards committee meeting Jul. 15, 2008; doc.: IEEE 802.11-08/0759r0, 14 pages.

3COM, Wireless LAN Mobility System: Wireless LAN Switch and Controller Configuration Guide, 3COM, Revision A, Oct. 2004, 476 pages.

3COM, Wireless LAN Switch Manager (3WXM), 3COM, Revision C, Oct. 2004, 8 pages.

3COM, Wireless LAN Switch and Controller; Quick Start Guide, 3COM, Revision B, Nov. 2004, 10 pages.

3COM, Wireless LAN Mobility System; Wireless LAN Switch and Controller Installation and Basic Configuration Guide, Revision B, Apr. 2005, 496 pages.

Johnson, David B, et al., "DSR The Dynamic Source Routing Protocol for Multi-Hop Wireless Ad Hoc Networks," Computer Science Department, Carnegie Mellon University, Nov. 3, 2005 (http://monarch.cs.rice.edu/monarch-papers/dsr-chapter00.pdf).

Information Sciences Institute, RFC-791 - Internet Protocol, DARPA, Sep. 1981.

Aerohive Blog, posted by Devin Akin, Cooperative Control: Part 3, [Online] Retrieved from the Internet: <URL: http://blog.aerohive.com/blog/?p=71> Mar. 1, 2010 (3 pages).

Wikipedia, Wireless LAN, 2 definitions for wireless LAN roaming, [Online] [retrieved Oct. 4, 2010] Retrieved from the Internet: <URL: http://en.wikipedia.org/wiki/Wireless_LAN> (1 page).

Sangheon Pack et al. "Fast-handoff support in IEEE 802.11 wireless networks," IEEE Communications Surveys, IEEE, NY, NY, vol. 9, No. 1, Jan. 1, 2007 (pp. 2-12) ISSN: 1553-877X.

U.S. Appl. No. 12/603,391, filed Oct. 21, 2009.
U.S. Appl. No. 12/763,057, filed Apr. 19, 2010.
U.S. Appl. No. 09/866,474 filed May 29, 2001.
U.S. Appl. No. 13/017,801, filed Jan. 31, 2011.
Office Action for U.S. Appl. No. 12/957,997, mailed Aug. 28, 2012.
Office Action for U.S. Appl. No. 11/784,307, mailed Sep. 22, 2009.
Final Office Action for U.S. Appl. No. 11/784,307, mailed Jun. 14, 2010.
Non-Final Office Action for U.S. Appl. No. 11/377,859, mailed Jan. 8, 2008.
Final Office Action for U.S. Appl. No. 11/377,859, mailed Aug. 27, 2008.
Office Action for U.S. Appl. No. 12/401,073, mailed Aug. 23, 2010.
Final Office Action for U.S. Appl. No. 12/401,073, mailed Apr. 1, 2011.
Office Action for U.S. Appl. No. 12/401,073, mailed Sep. 20, 2011.
Office Action for U.S. Appl. No. 11/326,966, mailed Nov. 14, 2008.
Office Action for U.S. Appl. No. 12/500,392, mailed Jun. 20, 2011.
Office Action for U.S. Appl. No. 11/400,165, mailed Aug. 19, 2008.
Office Action for U.S. Appl. No. 12/489,295, mailed Apr. 27, 2011.
Final Office Action for U.S. Appl. No. 12/489,295, mailed Jan. 18, 2012.
Office Action for U.S. Appl. No. 11/330,877, mailed Sep. 11, 2008.
Final Office Action for U.S. Appl. No. 11/330,877, mailed Mar. 13, 2009.
Office Action for U.S. Appl. No. 11/330,877, mailed Aug. 6, 2009.
Final Office Action for U.S. Appl. No. 11/330,877, mailed Apr. 22, 2010.
Office Action for U.S. Appl. No. 11/330,877, mailed Jan. 13, 2011.
Final Office Action for U.S. Appl. No. 11/330,877, mailed May 27, 2011.
Office Action for U.S. Appl. No. 11/351,104, mailed Oct. 28, 2008.
Office Action for U.S. Appl. No. 11/351,104, mailed Dec. 2, 2009.
Final Office Action for U.S. Appl. No. 11/351,104, mailed Jun. 10, 2009.
Office Action for U.S. Appl. No. 11/351,104, mailed May 26, 2010.
Office Action for U.S. Appl. No. 11/351,104, mailed Nov. 29, 2010.
Office Action for U.S. Appl. No. 11/351,104, mailed Jul. 26, 2011.
Office Action for U.S. Appl. No. 11/351,104, mailed Feb. 15, 2012.
Final Office Action for U.S. Appl. No. 11/351,104, mailed Aug. 14, 2012.
Non-Final Office Action for U.S. Appl. No. 11/351,104, mailed Dec. 17, 2012.
Office Action for U.S. Appl. No. 11/437,537, mailed Dec. 23, 2008.
Final Office Action for U.S. Appl. No. 11/437,537, mailed Jul. 16, 2009.
Office Action for U.S. Appl. No. 11/331,789, mailed Jun. 13, 2008.
Final Office Action for U.S. Appl. No. 11/331,789, mailed Oct. 23, 2008.
Office Action for U.S. Appl. No. 11/331,789, mailed Aug. 5, 2009.
Office Action for U.S. Appl. No. 12/785,362, mailed Apr. 22, 2011.
Office Action for U.S. Appl. No. 11/417,830, mailed Nov. 14, 2008.
Final Office Action for U.S. Appl. No. 11/417,830, mailed May 28, 2009.
Office Action for U.S. Appl. No. 11/417,993, mailed Oct. 29, 2008.
Office Action for U.S. Appl. No. 12/370,562, mailed Sep. 30, 2010.
Office Action for U.S. Appl. No. 12/370,562, mailed Apr. 6, 2011.
Office Action for U.S. Appl. No. 12/370,562, mailed Jan. 17, 2012.
Final Office Action for U.S. Appl. No. 12/370,562, mailed Jul. 26, 2012.
Office Action for U.S. Appl. No. 11/592,891, mailed Jan. 15, 2009.
Final Office Action for U.S. Appl. No. 11/592,891, mailed Jul. 20, 2009.
Office Action for U.S. Appl. No. 11/595,119, mailed Jul. 21, 2009.
Final Office Action for U.S. Appl. No. 11/595,119, mailed Jan. 5, 2010.
Office Action for U.S. Appl. No. 11/595,119, mailed Aug. 19, 2010.
Final Office Action for U.S. Appl. No. 11/595,119, mailed Aug. 2, 2011.
Office Action for U.S. Appl. No. 11/604,075, mailed May 3, 2010.
Office Action for U.S. Appl. No. 13/437,669, mailed May 30, 2012.
Office Action for U.S. Appl. No. 13/437,673, mailed May 30, 2012.
Office Action for U.S. Appl. No. 11/845,029, mailed Jul. 9, 2009.
Final Office Action for U.S. Appl. No. 11/845,029, mailed Jan. 25, 2010.
Office Action for U.S. Appl. No. 11/845,029, mailed May 14, 2010.
Final Office Action for U.S. Appl. No. 11/845,029, mailed Dec. 9, 2010.
Office Action for U.S. Appl. No. 11/845,029, mailed Sep. 27, 2011.
Office Action for U.S. Appl. No. 11/437,538, mailed Dec. 22, 2008.
Final Office Action for U.S. Appl. No. 11/437,538, mailed Jun. 10, 2009.
Office Action for U.S. Appl. No. 11/437,387, mailed Dec. 23, 2008.
Final Office Action for U.S. Appl. No. 11/437,387, mailed Jul. 15, 2009.
Office Action for U.S. Appl. No. 11/437,582, mailed Jan. 8, 2009.
Final Office Action for U.S. Appl. No. 11/437,582, mailed Jul. 22, 2009.
Office Action for U.S. Appl. No. 12/683,281, mailed Jan. 20, 2012.
Final Office Action for U.S. Appl. No. 12/683,281, mailed Sep. 21, 2012.
Office Action for U.S. Appl. No. 11/801,964, mailed Sep. 17, 2010.
Final Office Action for U.S. Appl. No. 11/801,964, mailed May 11, 2011.
Office Action for U.S. Appl. No. 12/304,100, mailed Jun. 17, 2011.
Final Office Action for U.S. Appl. No. 12/304,100, mailed Feb. 2, 2012.
Office Action for U.S. Appl. No. 12/304,100, mailed May 29, 2012.
Final Office Action for U.S. Appl. No. 12/304,100, mailed Dec. 11, 2012.
Office Action for U.S. Appl. No. 11/487,722, mailed Aug. 7, 2009.
Office Action for U.S. Appl. No. 11/643,329, mailed Jul. 9, 2010.
Office Action for U.S. Appl. No. 11/648,359, mailed Nov. 19, 2009.
Office Action for U.S. Appl. No. 11/944,346, mailed Nov. 23, 2010.
Office Action for U.S. Appl. No. 13/568,861, mailed Oct. 24, 2012.
Office Action for U.S. Appl. No. 12/077,051, mailed Dec. 28, 2010.
Final Office Action for U.S. Appl. No. 12/077,051, mailed Oct. 25, 2011.
Office Action for U.S. Appl. No. 12/113,535, mailed Apr. 21, 2011.
Final Office Action for U.S. Appl. No. 12/113,535, mailed Jan. 3, 2012.
Office Action for U.S. Appl. No. 12/113,535, mailed Apr. 20, 2012.

Office Action for U.S. Appl. No. 12/113,535, mailed Nov. 1, 2012.
Office Action for U.S. Appl. No. 11/852,234, mailed Jun. 29, 2009.
Office Action for U.S. Appl. No. 11/852,234, mailed Jan. 21, 2010.
Office Action for U.S. Appl. No. 11/852,234, mailed Aug. 9, 2010.
Office Action for U.S. Appl. No. 11/852,234, mailed Apr. 27, 2011.
Final Office Action for U.S. Appl. No. 11/852,234, mailed Jan. 20, 2012.
Office Action for U.S. Appl. No. 11/970,484, mailed Nov. 24, 2010.
Final Office Action for U.S. Appl. No. 11/970,484, mailed Jul. 22, 2011.
Office Action for U.S. Appl. No. 11/970,484, mailed Jun. 20, 2012.
Office Action for U.S. Appl. No. 12/172,195, mailed Jun. 1, 2010.
Office Action for U.S. Appl. No. 12/172,195, mailed Nov. 12, 2010.
Office Action for U.S. Appl. No. 12/172,195, mailed Feb. 14, 2013.
Office Action for U.S. Appl. No. 12/336,492, mailed Sep. 15, 2011.
Final Office Action for U.S. Appl. No. 12/336,492, mailed Jun. 15, 2012.
Office Action for U.S. Appl. No. 12/210,917, mailed Nov. 15, 2010.
Final Office Action for U.S. Appl. No. 12/210,917, mailed May 13, 2011.
Office Action for U.S. Appl. No. 12/210,917, mailed Dec. 5, 2011.
Office Action for U.S. Appl. No. 10/235,338, mailed Jan. 8, 2003.
Office Action for U.S. Appl. No. 11/094,987, mailed Dec. 27, 2007.
Final Office Action for U.S. Appl. No. 11/094,987, mailed May 23, 2008.
Office Action for U.S. Appl. No. 11/094,987, mailed Oct. 21, 2008.
Office Action for U.S. Appl. No. 12/474,020, mailed Jun. 3, 2010.
Final Office Action for U.S. Appl. No. 12/474,020, mailed Oct. 4, 2010.
Office Action for U.S. Appl. No. 09/866,474, mailed Nov. 30, 2004.
Final Office Action for U.S. Appl. No. 09/866,474, mailed Jun. 10, 2005.
Office Action for U.S. Appl. No. 10/667,027, mailed Jul. 29, 2005.
Final Office Action for U.S. Appl. No. 10/667,027, mailed Mar. 10, 2006.
Office Action for U.S. Appl. No. 10/667,027, mailed May 5, 2006.
Final Office Action for U.S. Appl. No. 10/667,027, mailed Feb. 26, 2007.
Office Action for U.S. Appl. No. 10/666,848, mailed Mar. 22, 2007.
Office Action for U.S. Appl. No. 10/667,136, mailed Jan. 25, 2006.
Office Action for U.S. Appl. No. 10/667,136, mailed Aug. 28, 2006.
Final Office Action for U.S. Appl. No. 10/667,136, mailed Mar. 9, 2007.
Extended Search Report for European Application No. 11188566.1, mailed Jan. 30, 2012.
International Search Report and Written Opinion for PCT/US05/004702, mailed Aug. 10, 2006.
International Search Report and Written Opinion for PCT/US2006/009525, mailed Sep. 13, 2007.
International Search Report and Written Opinion for PCT/US06/40500, mailed Aug. 17, 2007.
International Search Report and Written Opinion for PCT/US06/40498, mailed Dec. 28, 2007.
International Search Report and Written Opinion for PCT/US2007/012194 dated Feb. 4, 2008.
International Search Report and Written Opinion for PCT/US06/40499, mailed Dec. 13, 2007.
International Search Report and Written Opinion for PCT/US2007/19696, mailed Feb. 29, 2008.
International Search Report and Written Opinion for PCT/US2007/12016, mailed Jan. 4, 2008.
International Search Report and Written Opinion for PCT/US2007/012195, mailed Mar. 19, 2008.
International Search Report and Written Opinion for PCT/US07/013758 mailed Apr. 3, 2008.
First Office Action for Chinese Application No. 200780029623.X, mailed Dec. 31, 2010.
Second Office Action for Chinese Application No. 200780029623.X, mailed Mar. 7, 2012.
Third Office Action for Chinese Application No. 200780029623.X, mailed Sep. 29, 2012.
Extended Supplementary European Search Report for Application No. 07796005.2, mailed Feb. 14, 2012.
European Examination Report for Application No. 07796005.2, mailed Sep. 4, 2012.
International Search Report and Written Opinion for PCT/US07/013757, mailed Jan. 22, 2008.
International Search Report and Written Opinion for PCT/US07/14847, mailed Apr. 1, 2008.
International Search Report and Written Opinion for PCT/US07/089134, mailed Apr. 10, 2008.
International Search Report and Written Opinion for PCT/US2008/010708, mailed May 18, 2009.
Office Action for Canadian Application No. 2,638,754, mailed Oct. 3, 2011.
Supplementary Partial European Search Report for European Application No. 02770460, mailed Aug. 20, 2004.
Supplementary Partial European Search Report for European Application No. 02770460, mailed Dec. 15, 2004.
Examination Report for European Application No. 02770460, Mar. 18, 2005.
Summons for Oral Hearing Proceedings for European Application No. 02770460, Jan. 31, 2006.
International Search Report for PCT/US02/28090, mailed Aug. 13, 2003.
International Preliminary Examination Report for PCT/US02/28090, mailed Oct. 29, 2003.
Examination Report for European Application No. 06006504, mailed Oct. 10, 2006.
English Translation of Office Action for Japanese Application No. 2006-088348, mailed Jan. 4, 2011.
International Search Report and Written Opinion for PCT/US04/30769, mailed Oct. 4, 2005.
International Search Report and Written Opinion for PCT/US04/30683, mailed Feb. 10, 2006.
International Search Report and Written Opinion for PCT/US04/30684, mailed Feb. 10, 2006.

* cited by examiner

SYSTEM AND NETWORK FOR WIRELESS NETWORK MONITORING

CROSS REFERENCE TO RELATED APPLICATIONS

This application is a continuation of U.S. application Ser. No. 12/785,362, entitled "SYSTEM AND NETWORK FOR WIRELESS NETWORK MONITORING," filed May 21, 2010 (now U.S. Pat. No. 8,116,275), which is a continuation of U.S. application Ser. No. 11/331,789, entitled "SYSTEM AND METHOD FOR WIRELESS NETWORK MONITORING," filed Jan. 14, 2006 (now U.S. Pat. No. 7,724,703), which claims priority to and the benefit of Provisional Patent Application Ser. No. 60/727,025 entitled "WIRELESS NETWORK SYSTEM AND METHOD" Oct. 13, 2005, all of which are incorporated herein by reference in their entireties.

BACKGROUND

Frame requests proved a way to sense frames transmitted on air on a channel. This can be valuable in a wireless network because it introduces a way to understand who is communicating on a channel, including learning, for example, Received Signal Strength Indication (RSSI) or other values associated with a client.

The 802.11k standard introduces Frame Request in 802.11k D3.0, section 7.3.2.21.7. However, the standard does not help to identify or locate a particular rogue device. For example, with the 802.11k, as it is proposed today, a device cannot query all trusted stations to go and look for a particular rogue device. In addition, the full frame report may or may not include a specific device, based upon the length of the report and what else might be happening on the channel. Moreover, the querying station has to digest a large report, when its needs may be for a single device. The standard also is relatively useless at identifying any disassociation or deauthentication storms or at identifying any CTS storm blocking a particular channel.

These are but a subset of the problems that may exist with the 802.11k standard, as it is proposed today, that are intended to characterize weaknesses in the prior art by way of example. The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for wireless network monitoring involves scanning channels using clients instead of access points. An example of a method according to the technique may include, for example, receiving from a wireless access point a command to perform a channel scanning function, listening on a channel associated with the channel scanning function, and sending RF data found on the channel to the wireless access point. The command may or may not be sent form a switch to the wireless access point. In an embodiment, data may or may not be filtered using one or more of channel number, mac address, frame type, and frame subtype. Reports generated from the data may be used to determine what countermeasures to use in response.

Another example of a method according to the technique may include, for example, scanning a first channel, switching from the first channel to a second channel, sending data on the second channel to an access point, switching from the second channel to the first channel, and resuming scanning on the first channel. In this way, continuous or nearly continuous scanning of a channel may be possible. Or, all channels could be scanned in this way.

Another example of a method according to the technique may include, for example, sending a command from an access point on a first channel to a proxy client, switching the proxy client to a second channel, forwarding the command from the proxy client to a client on the second channel, generating a report that is responsive to the command, switching the proxy client to the first channel, and forwarding the report from the proxy client to the access point.

A system according to the technique may include one or more scanning clients, proxy clients, multi-channel clients, or other clients that are capable of scanning channels in lieu of an access point.

The proposed system can offer, among other advantages, clients that can scan channels in lieu of an access point scanning the channels. These and other advantages of the present invention will become apparent to those skilled in the art upon a reading of the following descriptions and a study of the several figures of the drawings.

BRIEF DESCRIPTION OF THE DRAWINGS

Embodiments of the invention are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
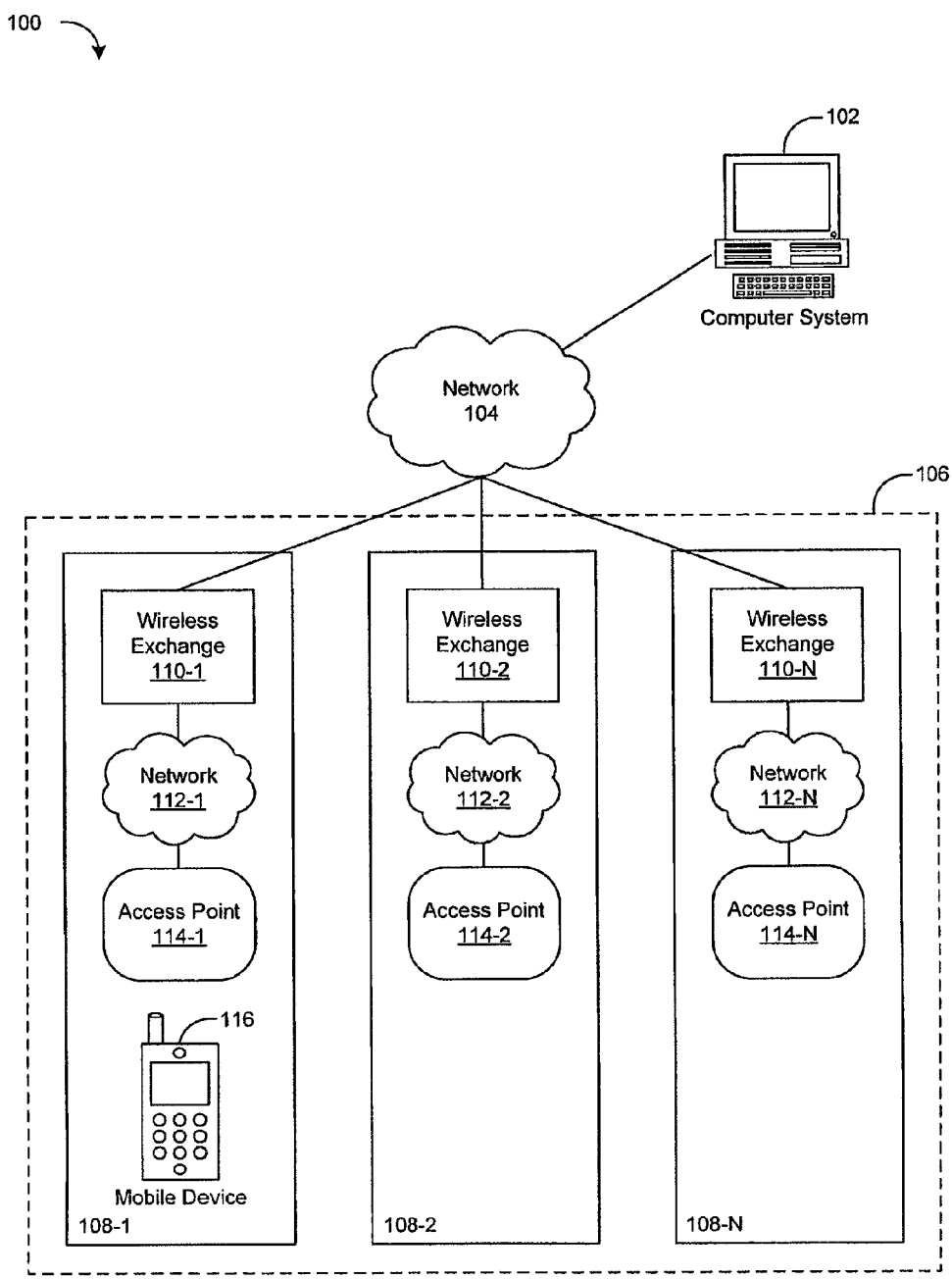
FIG. 1 depicts a system including a wireless access domain.

FIG. 1 depicts a system 100 including a wireless access domain. The system 100 includes a computer system 102, a network 104, and a wireless access domain 106. The system 100 may or may not include multiple wireless access domains. The computer system 102 may be practically any type of device that is capable of communicating with a communications network, such as, by way of example but not limitation, a workstation. The network 104 may be practically any type of communications network, such as, by way of example but not limitation, the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web). The physical connections of the Internet and the protocols and communication procedures of the Internet are well known to those of skill in the art.

In a non-limiting embodiment, the computer system 102 may be running a program such as, by way of example but not limitation, ethereal, to decode, by way of example but not limitation, IEEE 802.11 standard packets encapsulated in TZSP that are received from the wireless access domain 106. In a non-limiting embodiment, the computer system 102 is connected to a wireless backbone network (not shown), either directly or indirectly through a wireless network.

In a non-limiting embodiment, the network 104 provides a Layer 2 path for Layer 3 traffic, preserving IP addresses, sessions, and other wired Layer 3 attributes as users roam throughout the wireless access domain 106. The network may or may not include a wireless backbone network, or be connected directly or indirectly to a wireless backbone network. Communications between the computer system 102 and the wireless access domain 106 are, therefore, Layer 3 traffic tunneled through Layer 2. Advantageously, by tunneling Layer 3 traffic at Layer 2, users stay connected with the same IP address and keep the same security and Quality of Service (QoS) policies from the wired network while they roam the wireless side. Since Layer 3 attributes are maintained, mobile devices that are connected to the wireless access domain 106 can retain persistent identities.

The seven layers of the Open System Interconnection (OSI) model, of which Layers 2 and 3 are a part, are well-known to those of skill in the relevant art, and are, therefore, not described herein in any substantial detail. It should be noted, however, that Layer 3 is known as the "Network Layer" because it provides switching and routing technologies, creating logical paths, known as virtual circuits, for transmitting data from node to node. Routing and forwarding are functions of this layer, as well as addressing, internetworking, error handling, congestion control and packet sequencing. Layer 2 is known as the "Data Link Layer" because at Layer 2 data packets are encoded and decoded into bits; and Layer 2 furnishes transmission protocol knowledge and management and handles errors in the physical layer, flow control and frame synchronization. The data link layer is divided into two sublayers: The Media Access Control (MAC) layer and the Logical Link Control (LLC) layer. The MAC sublayer controls how a computer on the network gains access to the data and permission to transmit it. The LLC layer controls frame synchronization, flow control, and error checking.

In non-limiting embodiments, the wireless access domain 106 may be referred to as, by way of example but not limitation, a Local Area Network (LAN), virtual LAN (VLAN), and/or wireless LAN (WLAN). The wireless access domain 106 gives each user a persistent identity that can be tracked and managed, no matter where they roam. The wireless access domain 106 may have one or more associated snoop filters. In an embodiment, the wireless access domain 106 may include one or more radios.

In the example of FIG. 1, the wireless access domain 106 includes access areas 108-1 to 108-N (hereinafter collectively referred to as access areas 108). The access areas 108 have characteristics that depend upon, among other things, a radio profile. A radio profile is a group of parameters such as, by way of example but not limitation, beacon interval, fragmentation threshold, and security policies. In an embodiment, the parameters may be configurable in common across a set of radios in one or more access areas 108. In another embodiment, a few parameters, such as the radio name and channel number, must be set separately for each radio. An example of the implementation of a wireless access domain, provided by way of example but not limitation, includes a Trapeze Networks "identity-aware" Mobility Domain™.

In the example of FIG. 1, the following elements are associated with each of the access areas 108: Wireless exchange switches 110-1 to 110-N (hereinafter collectively referred to as wireless exchange switches 110), networks 112-1 to 112-N (hereinafter collectively referred to as networks 112), and access points 114-1 to 114-N (hereinafter collectively referred to as access points 114).

In an embodiment, the wireless exchange switches 110 swap topology data and client information that details each user's identity, location, authentication state, VLAN membership, permissions, roaming history, bandwidth consumption, and/or other attributes assigned by, by way of example but not limitation, an Authentication, Authorization, and Accounting (AAA) backend (not shown). In an embodiment, the wireless exchange switches 110 provide forwarding, queuing, tunneling, and/or some security services for the information the wireless exchange switches 110 receive from their associated access points 114. In another embodiment, the wireless exchange switches 110 coordinate, provide power to, and/or manage the configuration of the associated access points 114. An implementation of a wireless exchange switch, provided by way of example but not limitation, includes a Trapeze Networks Mobility Exchange™ switch. The Trapeze Networks Mobility Exchange™ switches may, in another implementation, be coordinated by means of the Trapeze Access Point Access (TAPA) protocol.

In an embodiment, the networks 112 are simply wired connections from the wireless exchange switches 110 to the access points 114. The networks 112 may or may not be part of a larger network. In a non-limiting embodiment, the networks 112 provides a Layer 2 path for Layer 3 traffic, preserving IP addresses, sessions, and other wired Layer 3 attributes as users roam throughout the wireless access domain 106. Advantageously, by tunneling Layer 3 traffic at Layer 2, users stay connected with the same IP address and keep the same security and Quality of Service (QoS) policies from the wired network while they roam the wireless side.

In a non-limiting embodiment, the access points 114 are hardware units that act as a communication hub by linking wireless mobile 802.11 stations such as PCs to a wired backbone network. In an embodiment, the access points 114 connect users to other users within the network and, in another embodiment, can serve as the point of interconnection between a WLAN and a fixed wire network. The number of users and size of a network help to determine how many access points are desirable for a given implementation. An implementation of an access point, provided by way of example but not limitation, includes a Trapeze Networks Mobility System™ Mobility Point™ (MP™) access point.

The access points 114 are stations that transmit and receive data (and may therefore be referred to as transceivers) using one or more radio transmitters. For example, an access point may have two associated radios, one which is configured for IEEE 802.11a standard transmissions, and the other which is configured for IEEE 802.11b standard transmissions. In a non-limiting embodiment, an access point transmits and receives information as radio frequency (RF) signals to and from a wireless client over a 10/100 BASE-T Ethernet connection. The access points 114 transmit and receive information to and from their associated wireless exchange switches 110. Connection to a second wireless exchange switch provides redundancy.

A station, as used herein, may be referred to as a device with a media access control (MAC) address and a physical layer (PHY) interface to the wireless medium that comply with the IEEE 802.11 standard. As such, in a non-limiting embodiment, the access points 114 are stations. Similarly, the wireless client 116 may be implemented as a station. In alternative embodiments, a station may comply with a different standard than IEEE 802.11, and may have different interfaces to a wireless or other medium.

In operation, a wireless client 116 can roam from one of the access areas 108 to another of the access areas 108. For example, in the example of FIG. 1 the wireless client 116 moves from the access area 108-1 to the access area 108-N. In an embodiment, the wireless client 116 can maintain a single IP address and associated data sessions. The ability of the wireless client 116 to roam across the access areas 108 while maintaining a single IP address and associated data sessions may be referred to as subnet mobility. Advantageously, the system 100 may be implemented using identity-based networking, which is a technique that enforces network authorization attributes to the wireless client 116 based on client identity rather than the port or device through which the wireless client 116 connects to the network. This technique enables both a single persistent login and passport free roaming which permits the introduction of services such as voice to a wireless LAN.

Figure 2:
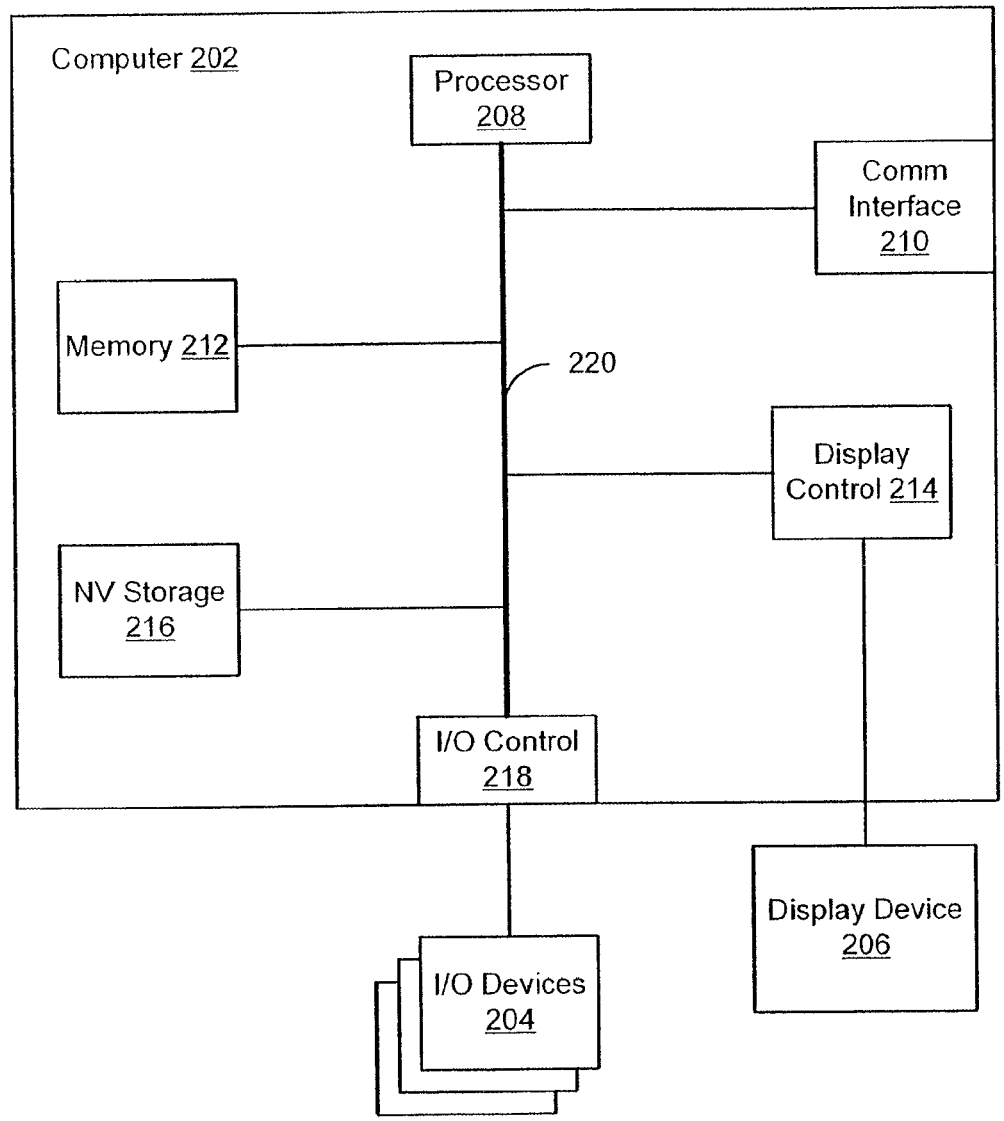
FIG. 2 depicts a computer system for use in the system of FIG. 1.

FIG. 2 depicts a computer system 200 for use in the system 100 (FIG. 1). The computer system 200 may be a conventional computer system that can be used as a client computer system, such as a wireless client or a workstation, or a server computer system. The computer system 200 includes a computer 202, I/O devices 204, and a display device 206. The computer 202 includes a processor 208, a communications interface 210, memory 212, display controller 214, non-volatile storage 216, and I/O controller 218. The computer 202 may be coupled to or include the I/O devices 204 and display device 206.

The computer 202 interfaces to external systems through the communications interface 210, which may include a modem or network interface. It will be appreciated that the communications interface 210 can be considered to be part of the computer system 200 or a part of the computer 202. The communications interface 210 can be an analog modem, ISDN modem, cable modem, token ring interface, satellite transmission interface (e.g. "direct PC"), or other interfaces for coupling a computer system to other computer systems.

The processor 208 may be, for example, a conventional microprocessor such as an Intel Pentium microprocessor or Motorola power PC microprocessor. The memory 212 is coupled to the processor 208 by a bus 220. The memory 212 can be Dynamic Random Access Memory (DRAM) and can also include Static RAM (SRAM). The bus 220 couples the processor 208 to the memory 212, also to the non-volatile storage 216, to the display controller 214, and to the I/O controller 218.

The I/O devices 204 can include a keyboard, disk drives, printers, a scanner, and other input and output devices, including a mouse or other pointing device. The display controller 214 may control in the conventional manner a display on the display device 206, which can be, for example, a cathode ray tube (CRT) or liquid crystal display (LCD). The display controller 214 and the I/O controller 218 can be implemented with conventional well known technology.

The non-volatile storage 216 is often a magnetic hard disk, an optical disk, or another form of storage for large amounts of data. Some of this data is often written, by a direct memory access process, into memory 212 during execution of software in the computer 202. One of skill in the art will immediately recognize that the terms "machine-readable medium" or "computer-readable medium" includes any type of storage device that is accessible by the processor 208 and also encompasses a carrier wave that encodes a data signal.

The computer system 200 is one example of many possible computer systems which have different architectures. For example, personal computers based on an Intel microprocessor often have multiple buses, one of which can be an I/O bus for the peripherals and one that directly connects the processor 208 and the memory 212 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 212 for execution by the processor 208. A Web TV system, which is known in the art, is also considered to be a computer system, but it may lack some of the features shown in FIG. 2, such as certain input or output devices. A typical computer system will usually include at least a processor, memory, and a bus coupling the memory to the processor.

In addition, the computer system 200 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 216 and causes the processor 208 to execute the various acts required by the operating system to input and output data and to store data in memory, including storing files on the non-volatile storage 216.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Figure 3:
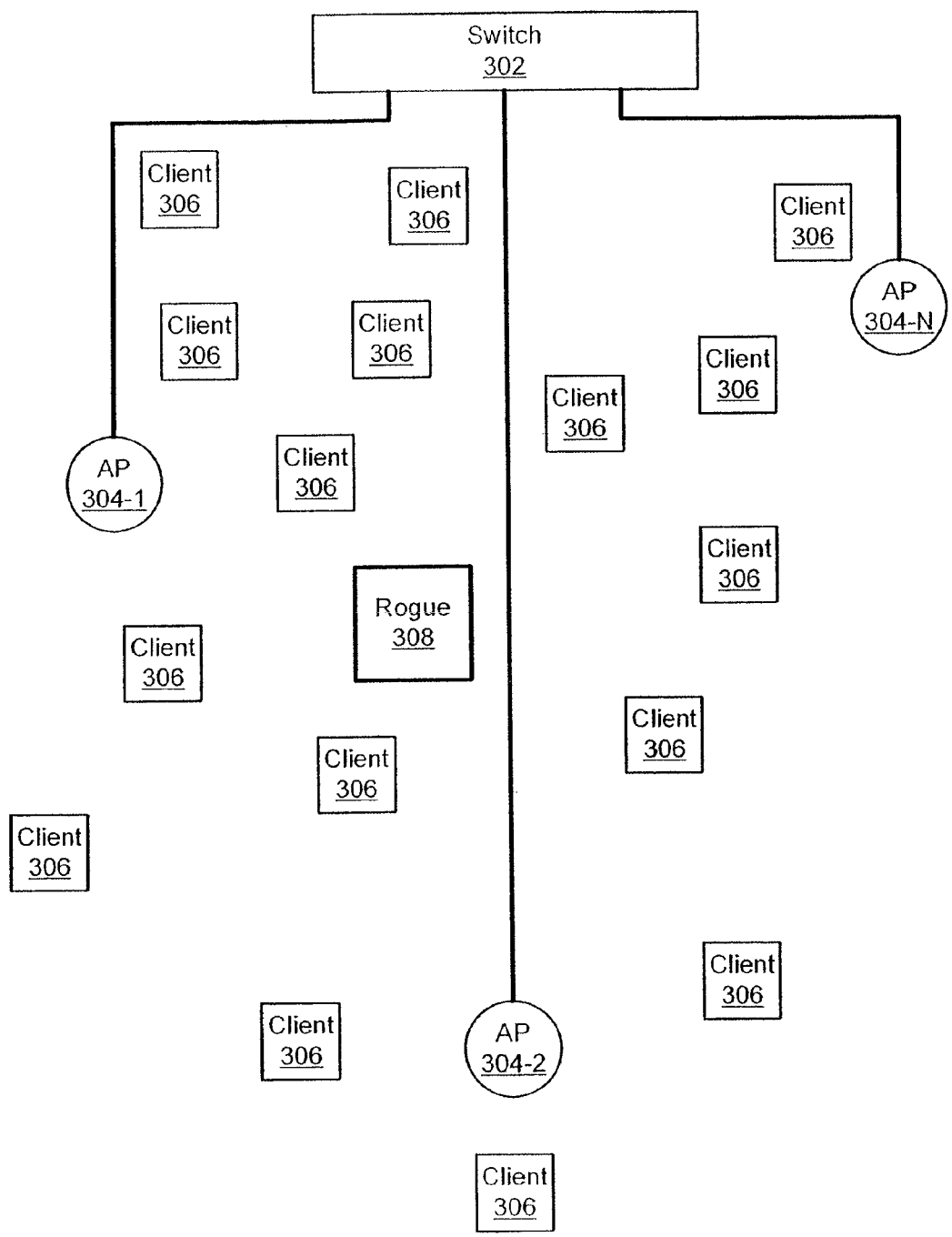
FIG. 3 depicts an access area with multiple scanning clients.

FIG. 3 depicts an access area 300 with multiple scanning clients. In the example of FIG. 3, the access area includes a switch 302, Access Points (APs) 304-1 to 304-N (hereinafter collectively referred to as APs 304), clients 306, and (for illustrative purposes) a rogue device 308. Advantageously, using multiple clients for scanning channels provides significantly better location detection than would be achieved using a single AP. When multiple clients, for example, look for a particular mac address, it becomes easier to triangulate thanks to the increased number of points of reference. The enhanced location detection can be useful not only for detecting and locating a rogue device 308, but also for interfering clients, or just to acquire information about where a client is.

Advantageously, by finding out which clients are on a particular set of channels, it may be possible to do load balancing. For example, if more clients are on one channel than another, the clients could be instructed to change channels.

Rogues may try to spoof an AP. In an embodiment, when the clients 306 look for a rogue channel, they also know the signal strength, which is passed to APs 304 and to the switch 302. The switch 302 knows where the APs 304 are (all of which may be passing RSSI information). There will be a large discrepancy between signal strengths of the APs 304 and the rogue device 308.

Figure 4:
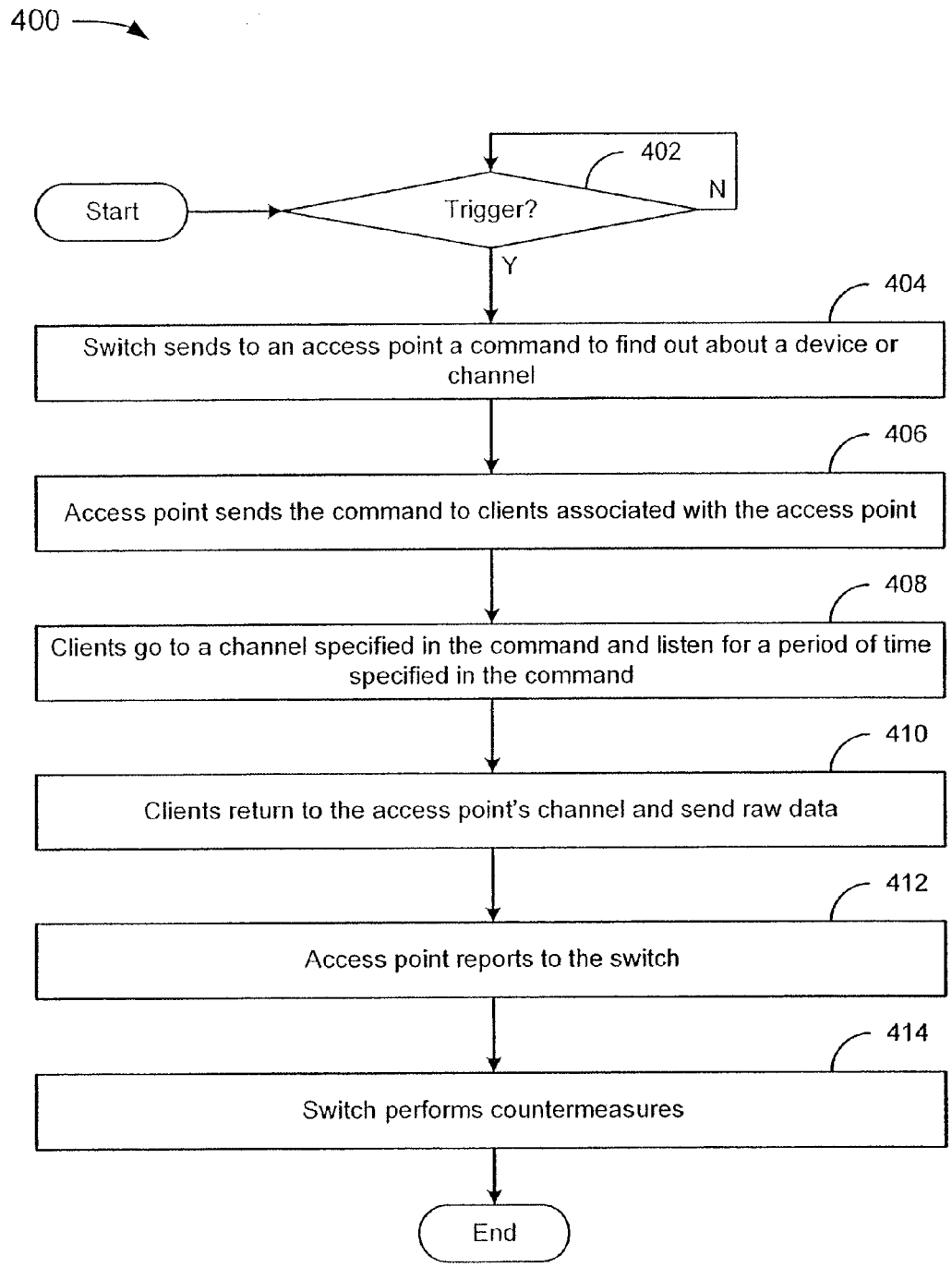
FIGS. 4-8 depict flowcharts of examples of methods for wireless network monitoring.

FIG. 4 depicts a flowchart 400 of a method for wireless network monitoring. This method and other methods are depicted as serially arranged modules. However, modules of the methods may be reordered, or arranged for parallel execution as appropriate. FIG. 4 is intended to illustrate a first example of operation of a system such as that depicted in FIG. 3, using the techniques described herein. The flowchart 400 continues from a determination that a trigger has occurred to the conclusion of activity that is a result of the trigger. When describing the flowchart 400, for illustrative purposes only, reference is made to components depicted in FIG. 3. However, it should be noted that the method of FIG. 4 is not intended to be limited to the components depicted in FIG. 3, and may be applicable to other systems and configurations.

In the example of FIG. 4, the flowchart 400 starts at decision point 402 where it is determined whether a trigger has occurred. In the context of FIG. 4, a trigger is any event that stimulates the system to take the steps necessary to generate a report regarding a rogue device, a client, a channel, or some other aspect or component of a wireless network. The trigger may include, but is not limited to a random trigger, an unscheduled trigger, or a scheduled trigger. The trigger may or may not be in response to analysis of prior reports, instructions from an administrator, messages from another switch, an apparent network outage, messages from a client, messages from an AP, or practically any other stimulus that is deemed to be potentially indicative of a problem, or useful in helping to detect a problem, in a wireless network. The commands should be appropriate for the trigger. For example, in response to an apparent network outage on a particular channel, a switch may send a command to listen for beacons on that channel.

In the example of FIG. 4, if it is determined that a trigger has not occurred (402-N), then the flowchart 400 repeats decision point 402 until a trigger does occur. It may be noted that the loop need not be an active check for a triggering condition; rather the loop could simply represent the time lag until a trigger actually occurs. The stimulus for a trigger may originate within a switch, or higher up.

In the example of FIG. 4, when it is determined that a trigger has occurred (402-Y), the flowchart 400 continues at module 404 with the switch 302 sending to one or more of the APs 304 a command to find out more about a device, such as the rogue device 308 or one or more of the clients 306, or channel. The command could be sent to a single AP or multiple APs. When sending to multiple APs, the command may be sent to each AP for a given switch, all of the APs of a mobile domain, or some subset of the APs of a mobile domain. In some implementations, it may even be desirable to send the command to APs of multiple mobile domains.

In the example of FIG. 4, the flowchart 400 continues at module 406 with sending the command to clients associated with and/or within range of the AP. The clients may include all clients 306, or a subset of clients 306 within the access area of the relevant APs 304. The command may include, for example, instructions for the client to go to a particular channel and listen for a specified time. Each of the clients may be given a slightly different command. For example, a first client may be instructed to go to channel 1, and a second client may be instructed to go to a channel 2. In a specific embodiment, an AP may have multiple dedicated clients. In this specific embodiment, it may be unnecessary to send the command to clients other than the dedicated clients, since the dedicated clients perform all of the scanning routines. Of course, other clients could serve a backup function, such as when the dedicated clients are all busy or otherwise unavailable.

In the example of FIG. 4, the flowchart 400 continues at module 408 with one or more clients 306 going to a channel specified in the command and listening (or scanning) for a period of time specified in the command. In alternative embodiments, the command need not specify a channel. By way of example but not limitation, each client may be preconfigured to scan a particular channel, obviating the need for a command to specify the channel. In alternative embodiments, the command need not specify a period of time. By way of example but not limitation, each client (or all of the clients 306) may be pre-configured to scan for a set amount of time, obviating the need for a command to specify a period of time.

In the example of FIG. 4, the flowchart 400 continues at module 410 with the clients going back to the AP's channel to send raw data. APs typically operate on a single channel, so it may be assumed that clients will also operate on a single channel, which would have the benefit of more inexpensive client devices. Thus, the clients must typically switch between channels to respectively scan and to send data (assuming they are scanning a channel other than the one on which the AP is operating). In alternative embodiments, the clients may operate on multiple channels. In such a case, it may not be necessary for the client to switch from a scanned channel to the AP's channel; rather, the client may scan on a channel, and send on another channel without switching.

In order to reduce the amount of data sent from the clients 306 to the APs 304, it may be desirable to give the clients 306 the ability to generate reports from the raw data collected. Alternatively, the clients 306 could be given the ability to pre-process some of the raw data.

In the example of FIG. 4, the flowchart 400 continues at module 412 with the AP reporting to the switch 302. The APs 304 may be given the task of analyzing raw data from the clients 306, depending upon the devices and/or the implementation. For example, the APs 304 could generate a report similar to that depicted in FIG. 9 from the raw data received from the clients 306. One of skill in the relevant art would recognize that such a report can be used to diagnose certain problems, and perform countermeasures in response if desired or available.

Alternatively, the APs 304 could be configured to perforin some pre-processing of raw data and allow the switch 302 (or a device that is higher up) generate the desired reports. Or, the APs 304 could simply pass the raw data on to the switch 302 (or a device that is higher up) for processing. This is an implementation decision. When pre-processing data at the APs 304, it may be desirable to remove some raw data if it can be omitted. It is believed that clients 306, when properly configured, can obtain as much information for the reports as an AP, so the AP should not be required to add additional data when pre-processing the raw data. Nevertheless, if it is determined that the AP can add data to the reports, then the APs 304 may be so configured.

In the example of FIG. 4, the flowchart 400 ends at module 414 with the switch performing countermeasures. The switch 302 may or may not analyze the reports. For example, the analysis could be done at the AP or, in the alternative, higher up. The switch 302 (or some other device) may decide upon and set into action countermeasures to respond to the rogue device 308, if the rogue device 308 is detected. The countermeasures could be in response to some other stimulus than the detection of the rogue device 308, as well.

Countermeasure techniques are known to those of skill in the relevant arts, and generally include measures that attack rogue devices within an access area, shore up the defenses of the network against such devices, or improve the network in some other way in response to a network problem. However, in the example of FIG. 4, these measures are intended to include any procedure that is a response to an analyzed report, including but not limited to sending a notification to an administrator, shutting down an access point, rebooting, or gathering additional information. As the reports include raw data, the problems detected may include anything that can be detected using the raw data. The number of problems or attacks that can be detected is practically impossible to list in its entirety, but includes and is not limited to spoofed network detection, CTS storms, rogue devices, etc.

Advantageously, these techniques obviate the need for the APs to scan any of the channels. It may be desirable for APs to scan channels if client scanning is not deemed sufficient, but the need for the APs to scan channels is at least reduced. Consequentially, service disruptions at the AP can be reduced.

Figure 5:
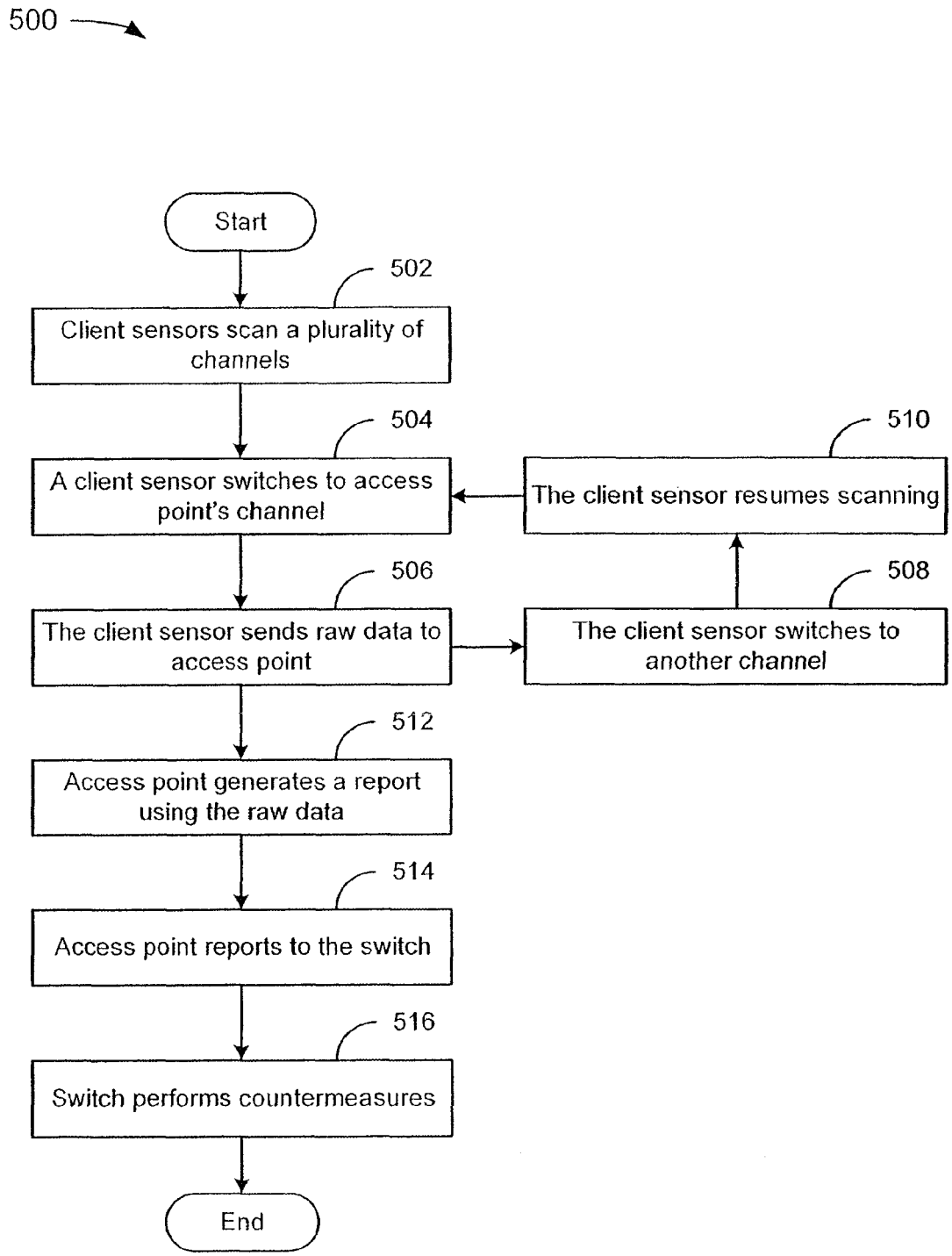

FIG. 5 depicts a flowchart 500 of a method for wireless network monitoring. FIG. 5 is intended to illustrate a second example of operation of a system such as that depicted in FIG. 3, using the techniques described herein, such as client sensors. In the example of FIG. 5, it is assumed that the client sensors are dedicated wireless sensors, rather than active clients spending time on channels to perform scanning. This is not required, but since dedicated wireless sensors may be considered extremely useful, considering their relatively low cost compared to an AP, and relatively simple deployment within a wireless network, it is appropriate to illustrate this advantage with reference to at least one flowchart—in this case FIG. 5. When describing the flowchart 500, for illustrative purposes only, reference is made to components depicted in FIG. 3. However, it should be noted that the method of FIG. 5 is not intended to be limited to the components depicted in FIG. 3, and may be applicable to other systems and configurations.

In the example of FIG. 5, the flowchart 500 starts at module 502 with using the client sensors 306 to scan a plurality of channels. For example, 802.11b may operate on 11 channels (in the United States, at least). So, 11 of the clients 306 may operate on the 11 channels (or a smaller number of clients 306 may operate on a smaller number of channels). Advantageously, this allows each of the client sensors 306 to generate nearly continuous reports. It should be noted that, in this example, a trigger may not be necessary since the channels can be scanned continuously and, if a threat is detected, countermeasures can be executed. In some cases, it may be desirable to include a trigger as well.

It should be noted that promiscuous listening might encounter thousands of nodes for a given period of time. Since large reports increase network usage, it may be desirable to provide more accurate detection so that reports can be smaller. Therefore, continuous reports may not be a desirable outcome. The balance between continuous, complete reports and deterministic rogue detection (or, for example, security detection, location detection, etc.) is an implementation decision that may be impacted one way or another depending upon the embodiment or configuration that is used. Advantageously, the techniques provided herein allow for either a broader (e.g., complete) report than ever before in 802.11, or for a more focused report than ever before in 802.11.

In the example of FIG. 5, the flowchart 500 continues at module 504 with a client sensor switches to the AP's channel. If a client sensor is scanning on the AP's channel then, of course, the client sensor need not change channels at this step. In other cases, assuming that the client sensor does not have a mechanism for scanning on one channel and transmitting on another, the client sensor may need to change to the AP's channel prior to communicating with the AP.

In the example of FIG. 5, the flowchart 500 continues at module 506 with the client sensor sends raw data to the AP. There is no technical reason why the client sensors 306 would be unable to scan for any RF activity that is within range. So, the amount of raw data can theoretically include all 802.11 RF activity in an embodiment in which 802.11 RF activity is the activity of interest. (In embodiments that do not use 802.11, other RF activity may be included.) In an embodiment, all of the raw data is sent from the client sensor to the AP.

In another embodiment, the raw data may be pre-processed to reduce the amount of data that is sent to the AP. In such an embodiment, the amount of data sent would depend upon the desired implementation of the system. In another embodiment, the client sensor may actually generate a report for sending to the AP. In such an embodiment, the AP (or switch, or other component that is higher up) may not need to perform any report generating functions. Indeed, the client sensors could even be programmed with countermeasure procedures, which could obviate the need for sending a report at all.

In the example of FIG. 5, the flowchart 500 continues at module 508 with the client sensor switches to another channel, and module 510 with the client sensor resumes scanning, and at module 504, which was described previously. (In the example of FIG. 5, the flowchart 500 also continues from module 506 to module 512, which is described later.) In an embodiment, at module 508, the client sensor switches back to the channel that it was scanning previously.

With appropriate configurations, every channel can be scanned continuously. A minimalist example (in which there are, for illustrative purposes, 11 channels) of such a configuration would include an AP and 11 clients. The AP scans its own channel. Periodically, each of the 10 clients switches to the AP's channel to send a report. When the clients switch to the AP's channel to send a report, they cannot continue to scan the previously scanned channel. However, when (or just before) the clients switch to the AP's channel, the 11th client switches to the previously scanned channel so that scanning can be essentially continuous. As each of the 10 clients, in turn, finish their reports, the 11th client switches back to the AP's channel to deliver the report for the previously scanned channel. This can result in continuous scanning of all channels using one client per channel.

Referring once again to FIG. 5, in an alternative embodiment, at module 508 the client sensor may switch to a channel that it was not immediately previously scanning. For example, it may be desirable to have client sensors rotate through channels so that scanning is continuous. If raw data proves to be too much to handle with only 12 (or 11) client sensors, the number could be increased. For example, 21 client sensors could be used to scan 11 channels, two for each channel, except the AP's channel, which may only require one client sensor because the client sensor does not need to change channels to send data. When one of the client sensors on a given channel is sending data to the AP, the other is scanning. When the reporting client sensor switches back, the scanning client sensor can switch to the AP's channel to deliver its data.

In the example of FIG. 5, the flowchart 500 continues at module 512 with the access point generates a report using the raw data, at module 514 with the access point reports to the switch, and at module 516 with the switch performs countermeasures.

Even with continuous scanning of channels, it may be desirable to implement additional redundancy. For example, it may be desirable to deploy, e.g., four clients (or client sensors) at four edges of an access area, and perhaps one client near the AP. This may facilitate detection of relatively distant rogue devices more quickly. It may also be desirable to place a client (or client sensor) approximately equidistant from two adjacent APs, and have the client report to both APs.

Figure 6:
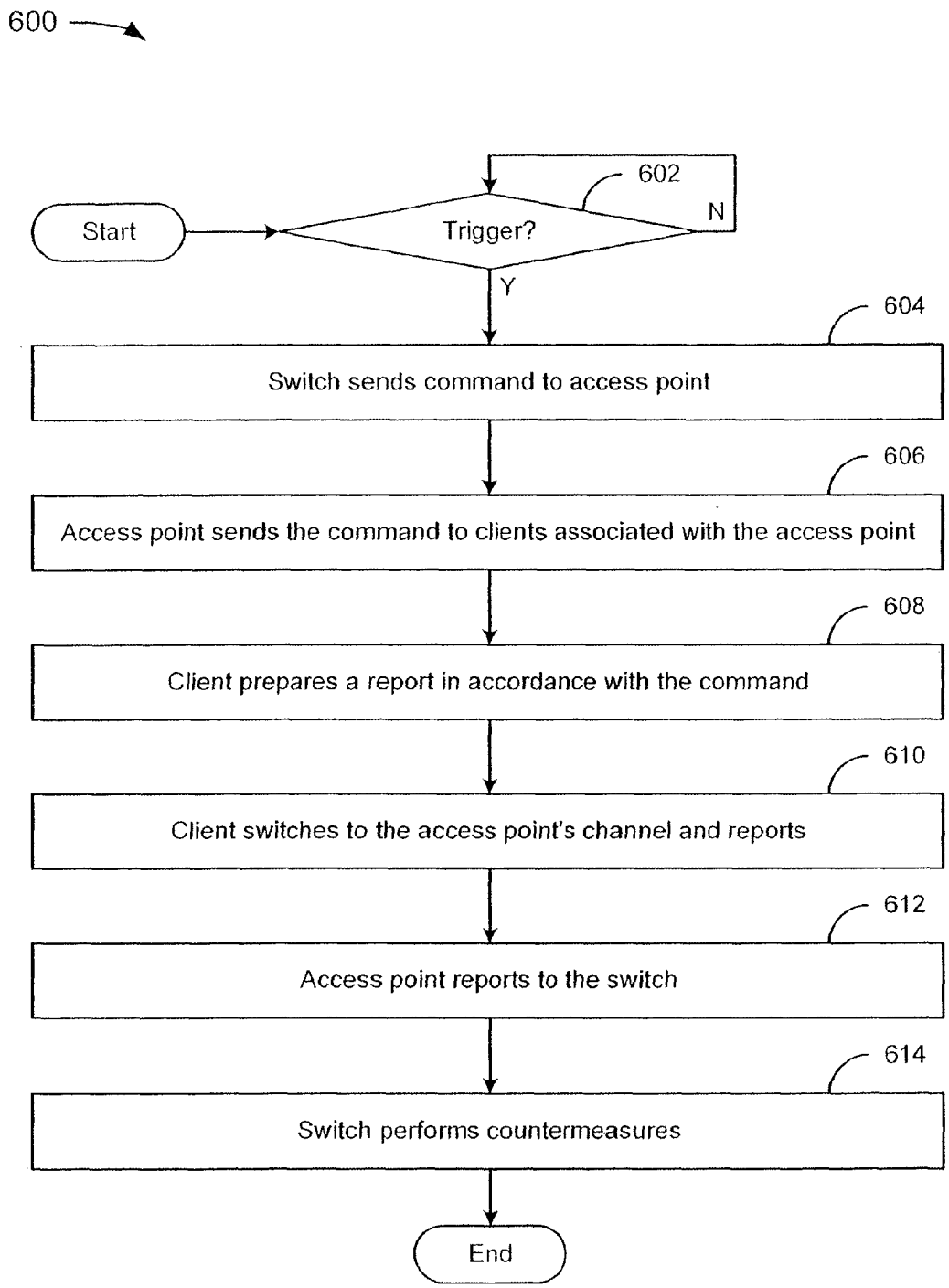

FIG. 6 depicts a flowchart 600 of a method for wireless network monitoring. FIG. 6 is intended to illustrate a third example of operation of a system such as that depicted in FIG. 3, in which the amount of data that is sent from the clients 306 to the APs 304 is intelligently reduced. In the example of FIG. 6, it is assumed that the clients 306 have report generating capabilities. This is not required, and this capability could be replaced with data pre-processing capabilities. When describing the flowchart 600, for illustrative purposes only, reference is made to components depicted in FIG. 3. However, it should be noted that the method of FIG. 6 is not intended to be limited to the components depicted in FIG. 3, and may be applicable to other systems and configurations.

In the example of FIG. 6, the flowchart 600 starts at decision point 602 where it is determined whether a trigger has occurred. In the example of FIG. 6, if it is determined that a trigger has not occurred (602-N), then the flowchart 600 repeats decision point 602 until a trigger does occur. When a trigger occurs (602-Y), the flowchart 600 continues at module 604 with the switch sending to one or more of the access points 304 a command.

In the example of FIG. 6, the flowchart 600 continues at module 606 with the AP sending the command to clients 306 associated with the AP. The clients to which the AP sends the command may vary depending upon implementation and/or the command itself. For example, if the command is a directive to listen on a particular channel for a given period of time, then only clients that are configured to listen on that channel would respond to the command. In an embodiment, only those clients that are configured to respond to a given command receive the command. Other commands may include listening for a particular mac address. In such a case, it may be desirable for all of the clients 306 to receive the command.

In the example of FIG. 6, the flowchart 600 continues at module 608 with the clients generating a report in accordance with the command. The amount of raw data that a client retains would depend primarily upon implementation. Very large storage capacities have the benefit of providing better reports in some cases, but at greater expense. Large storage capacities will also tend to increase physical size, and may or may not increase access times as well. Of course, generating reports from a large pool of data also takes longer. One of skill in the relevant art should be able to weigh the advantages and disadvantages to come up with a reasonable compromise between storage capacity and expense (or, e.g., access time).

In the example of FIG. 6, the flowchart 600 continues at module 610 with the client switches to the AP's channel and reports, at module 612 with the APs report to the switch, and at module 614 with the switch performs countermeasures.

In an embodiment, the APs have to switch channels in order to send commands to the various clients (or client sensors). This can result in a service disruption similar to that caused by active scan. To remedy this problem, it may be desirable to implement a proxy client.

Figure 7:
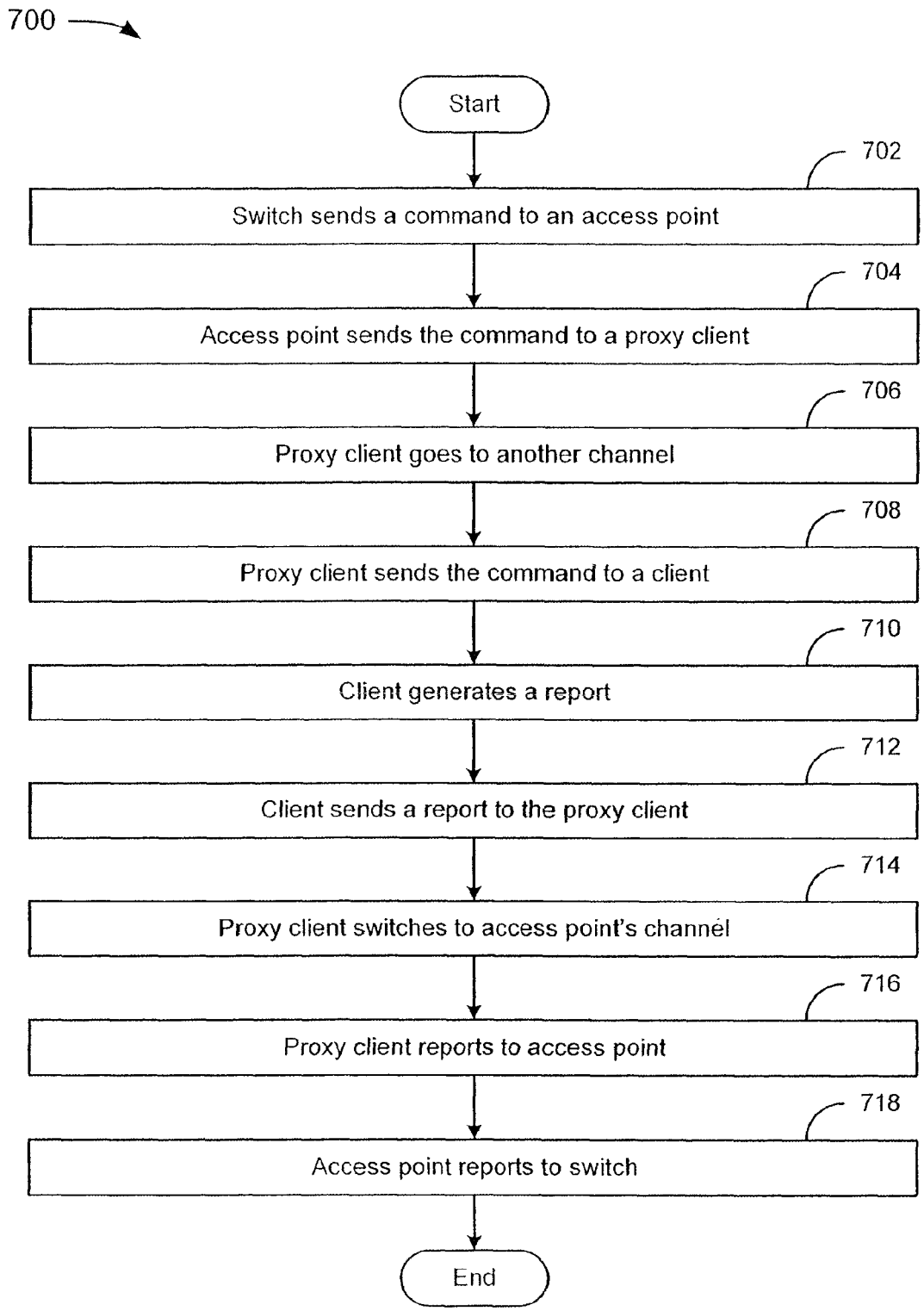

FIG. 7 depicts a flowchart 700 of a method for providing commands to client sensors. FIG. 7 is intended to illustrate a fourth example of operation of a system such as that depicted in FIG. 3, in which APs can transmit commands to client sensors without a service disruption.

In the example of FIG. 7, the flowchart 700 starts at module 702 with a switch sending a command to an AP. This may be, for example, in response to a trigger (not shown).

In the example of FIG. 7, the flowchart 700 continues at module 704 with an AP sending the command to a proxy client. The proxy client may be a client sensor that is on the same channel as the AP. The proxy client may or may not also be responsible for scanning on the AP's channel.

In the example of FIG. 7, the flowchart 700 continues at module 706 with the proxy client switching to another channel. The channel to which the proxy client switches may or may not be dependent upon the command. For example, if the command is to scan a particular channel, the proxy client may switch to that channel. As another example, if the command is to scan for a particular type of frame on any channel, then the proxy client may switch to each other channel in turn (or other proxy clients could be used to switch to the channels more quickly). Alternatively, the proxy client could just switch to each channel in turn regardless of the command, and the APs may or may not respond to the command depending upon the command's relevance to them.

In the example of FIG. 7, the flowchart 700 continues at module 708 with the proxy client sending the command to a client. Since the proxy client is a "proxy", the proxy client by definition passes the command on to a client. It should be noted, however, that a client could wait on the AP's channel until given a command, then switch to an appropriate channel or channels to carry out the command.

In the example of FIG. 7, the flowchart 700 continues at module 710 with the client generating a report. Since, in an embodiment, the client does not leave the channel, the client can amass continuous RF data on the channel. This data can be used to generate reports without any additional scanning. For example, if a command is sent periodically to check whether any suspicious activity is occurring on a channel, recent data may be as valuable as data that is acquired shortly after the command is received. So, the client could use a slightly dated report, and perhaps respond slightly faster to the command.

In the example of FIG. 7, the flowchart 700 continues at module 712 with the client sending the report to the proxy client and at module 714 with the proxy client switching to the AP's channel. In an alternative embodiment, the client and the proxy could switch places. For instance, the client could generate a report and switch to the AP's channel, and the proxy remain on the channel and begin scanning. An advantage of this embodiment is that the report need not be transmitted from client to client.

In the example of FIG. 7, the flowchart 700 continues at module 716 with the proxy client reporting to the AP, and at module 718 with the AP reporting to the switch. It may be noted that since the client generates the report, the AP only needs to forward the report on to the switch. Of course, the AP could perform additional processing, depending upon the implementation and/or configuration of the AP.

Figure 8:
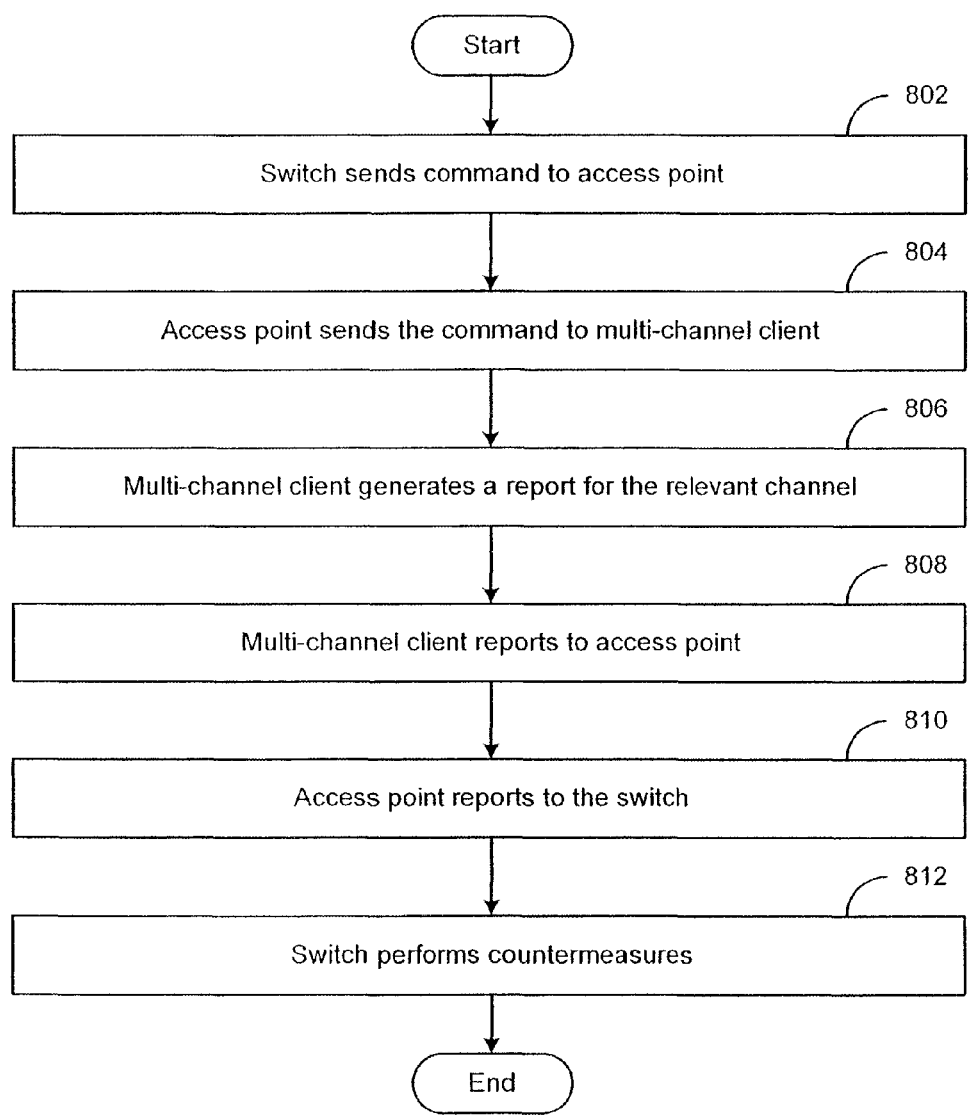

FIG. 8 depicts a flowchart 800 of a method for providing commands to multi-channel clients. FIG. 8 is intended to illustrate a fifth example of operation of a system such as that depicted in FIG. 3, in which continuous scanning of channels is possible without switching between channels.

In the example of FIG. 8, the flowchart 800 begins at module 802 with a switch sending a command to an AP and at module 804 with the AP sending the command to a multi-channel client. A multi-channel client may include a two or more sensors that can be set to different channels. The multi-channel client may further include a link between the two or more sensors. The link allows the multi-channel client to receive data on one channel, and transmit the data to another channel.

Alternatively or in addition, the multi-channel client can receive data on one channel, process the data into, for example, a report, and transmit the processed data to another channel. Alternatively or in addition, the multi-channel client can receive data on multiple channels, process the data into, for example, a report, and transmit the processed data to another channel (or one of the channels on which the data was received). In an embodiment, the multi-channel client could include one sensor for each channel. Thus, by way of example but not limitation, a multi-channel client with 14 channels could operate on all 14 channels of the 802.11b standard in Japan (in the US, 802.11b operates on only 11 channels at 2.4 GHz).

In the example of FIG. 8, the flowchart 800 continues at module 806 with the multi-channel client generating a report for the relevant channel. For example, if the command requires listening on all channels, the report could include data from each of the channels (in an embodiment or implementation wherein the multi-channel client includes a sensor for each channel). A command that only asks for a report on a single channel may only need data from that single channel.

In the example of FIG. 8, the flowchart 800 continues at module 808 with the multi-channel client reporting to the AP. It may be noted that it was not necessary for the multi-channel client to switch between channels. Accordingly, the multi-channel client can continue to scan on, potentially, all channels while reporting to the AP.

In the example of FIG. 8, the flowchart 800 continues at module 810 with the AP reporting to the switch and at module 812 with the switch performing countermeasures.

Figures 9, 10:
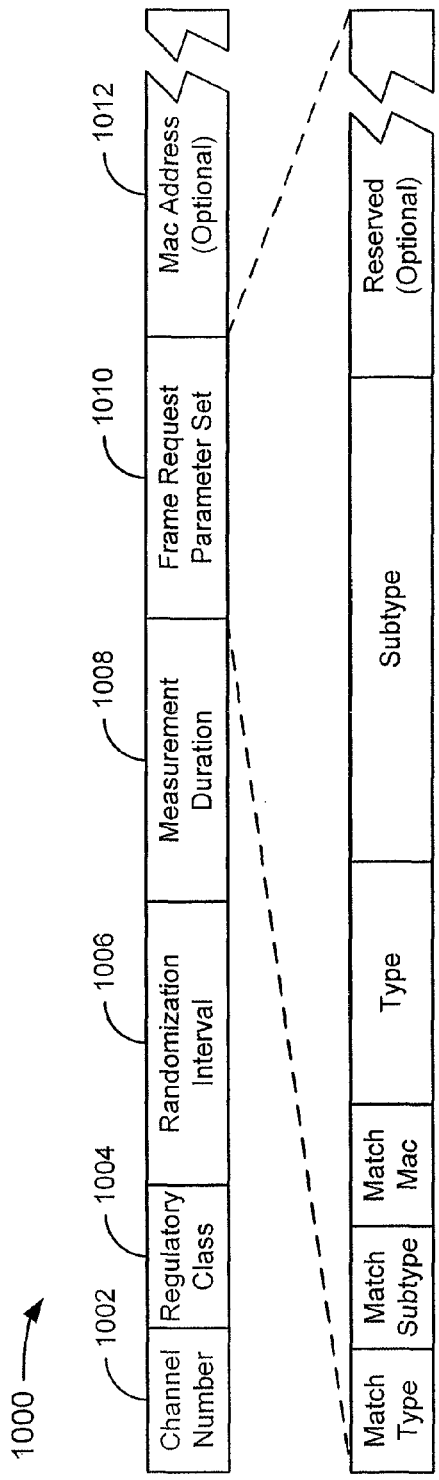
FIG. 9 depicts a conceptual diagram of a report.
FIG. 10 depicts a conceptual diagram of an example of a frame request frame.

FIG. 9 depicts a conceptual diagram of a report. In the example of FIG. 9, the report includes zero or more mac addresses and type, subtype, and number of frames associated with the mac addresses. FIG. 9 is intended to illustrate a report that can be generated using data acquired by clients. Those of skill in the relevant art would recognize that this report is similar to, for example, a report generated at an AP after the AP performed an active scan. Advantageously, using the techniques described herein, the report can be generated using clients and without active scan (and the associated service disruption).

FIG. 10 depicts a conceptual diagram of an example of a frame request frame 1000. In the example of FIG. 10, the frame request includes several fields, most of which would be self-explanatory to one of skill in the relevant art. The fields are, therefore, only briefly described, with the exception of field 1010, for which additional explanation is provided. It should be noted that FIG. 10 is intended to illustrate one of many possible frame requests. Other frame request embodiments could easily be created and used without deviating from the teachings provided herein.

In an embodiment, the frame request frame 1000 is part of a measurement request report mechanism. The frame request frame 1000 can be sent to clients in a wireless network. Clients go to the channel indicated in the Channel Number field. The clients then get frames and send data back, such as mac address and an associated RSSI, (plus, if desired, average and last RSSI).

The frame request frame 1000 facilitates looking for frames of a specific type or subtype. Requesting frames of a particular type allows recognition of security attacks, such as, by way of example but not limitation, CTS attack. You can ask stations to look for disassociate frames or disassociate frames from a particular address. Advantageously, in an embodiment, the mac address and frame type/subtype choices are distinct, thereby providing more flexibility in detecting, e.g., CTS storms, spoofed networks, and other attacks. For example, the AP could send a command to a client to scan a channel for a particular mac address and a particular type of frame, allowing for relatively specific reports. In general, it helps to know what kinds of frames, for example, interfering clients are using.

Field 1002 is Channel Number, which indicates the channel number for which the measurement request applies. Channel Number is defined within a Regulatory Class.

Field 1004 is Regulatory Class, which indicates the frequency band for which the measurement request applies.

Field 1006 is Randomization Interval, which specifies the upper bound of the random delay to be used prior to making the measurement in units of TU.

Field 1008 is Measurement Duration, which is set to the preferred duration of the requested measurement, expressed in TUs. If the Duration Mandatory bit is set to 1 in the Measurement Request Mode field this is interpreted as a mandatory measurement duration. If the Duration Mandatory bit is set to 0 this shall be interpreted as a target measurement duration.

Field 1010 is Frame Request Parameter Set, which is split, for illustrative purposes, into six subfields, Match Type bit, Match Subtype bit, Match Mac bit, Type, Subtype, and Reserved.

The Match Type bit indicates whether the type fields indicated in the Frame Request Parameter Set 1010 should match for the frames counted for frame report generation. If the bit is set to 1, only frames that match the type should be counted towards the generation of a frame report.

The Match Subtype bit is only valid when the match type bit is set to 1. This bit indicates whether the subtype field indicated in the Frame Request Parameter Set 1010 should match for the frames counted for frame report generation. If the bit is valid and is set to 1, only frames that match the subtype should be counted towards the generation of a frame report.

The Match Mac bit indicates whether the mac address included in the frame request frame 1000 should match for the frames counted for the frame report generation. If the bit is set to 1, only frames that match the Mac Address field 1012 should be counted towards the generation of a frame report. When this bit set to 1, the mac address field 1012 is mandatory.

The Type field is used to indicate the type of packets that would be counted towards the frame report generation. The Type field is only used when the Match Type bit is set to 1.

The Subtype field is used to indicate the subtype of packets that would be counted towards the frame report generation. The Subtype field is only used when the Match Subtype bit is valid and is set to 1.

The Reserved field is set to zeros on transmit and should be ignored on receive.

Field 1012 is Mac Address, which is included in the frame request 1000 if the match mac address field in the frame request parameter set is set to 1. If this field is included, only frames from this mac address are counted towards the frame report generated in response to this frame request.

Figure 11:
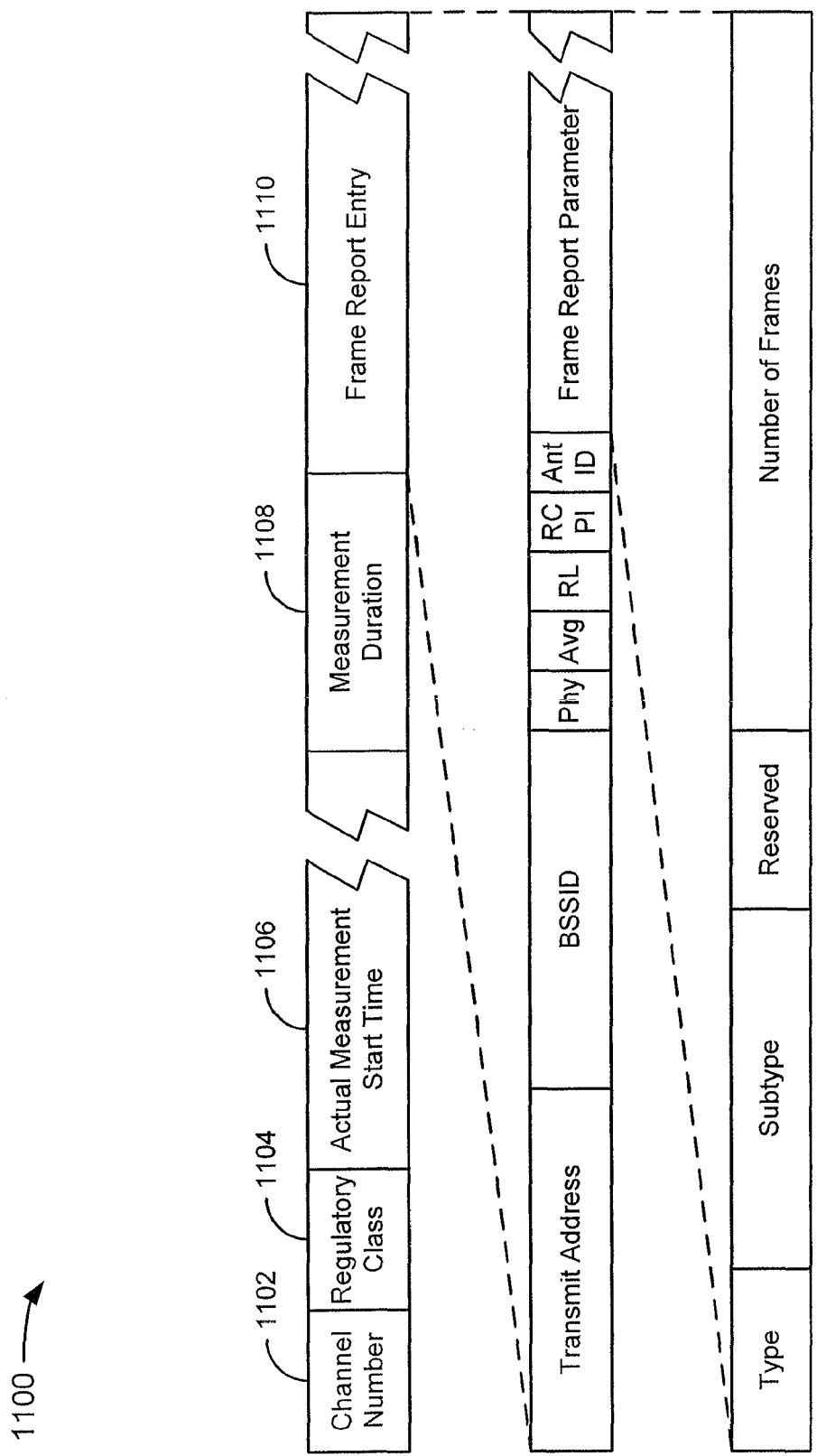
FIG. 11 depicts a conceptual diagram of an example of a frame report frame.

FIG. 11 depicts a conceptual diagram of an example of a frame report frame 1100. In the example of FIG. 11, the frame report frame 1100 includes several fields, most of which would be self-explanatory to one of skill in the relevant art. The fields are, therefore, only briefly described, with the exception of field 1110, for which additional explanation is provided. It should be noted that FIG. 11 is intended to illustrate one of many possible frame report frames. Other frame report embodiments could easily be created and used without deviating from the teachings provided herein.

Field 1102 is Channel Number, which indicates the channel number for which the measurement request applies. Channel Number is defined within a Regulatory Class.

Field 1104 is Regulatory Class, which indicates the frequency band for which the measurement request applies.

Field 1106 is Actual Measurement Start Time, which is set to the value of the measuring STA's TSF timer at the time the measurement started.

Field 1108 is Measurement Duration, which is set equal to the duration over which the Frame Report was measured, expressed in TUs.

Field 1110 is Frame Report Entry, which includes the fields Transmit Address, BSSID, Phy Type (Phy), Average RCPI (Avg), RSNI Last (RL), RCPI, Antenna ID (Ant ID), and Frame Report Parameter Set. The Transmit Address field contains the Transmit Address from the frames being reported. The BSSID field contains the BSSID from the frames being reported. PHY Type indicates the physical medium type for the frame(s) being reported. Valid entries are coded according to the value of dot11PHYType. Average RCPI indicates the average value for the received channel power of all the frames counted for this report. Average RCPI is reported in dBm, as defined in the RCPI measurement clause for the PHY Type. RSNI indicates the received signal to noise indication of the received frame in dBm. This field is the RSNI value for the most recently received frame. Last RCPI indicates the received channel power of the most recently counted frame in this Frame Report entry. Last RCPI is reported in dBm, as defined in the RCPI measurement clause for the PHY Type. The Antenna ID field contains the identifying number for the antenna used to receive the most recently counted frame in this Frame Report entry.

The Frame Report Parameter has four subfields: Type, Subtype, Reserved, and Number of Frames. The Type field indicates the type of the packets counted towards this frame report parameter set. The Subtype field is used to indicate the subtype of packets that were counted towards this frame report parameter set. Number of Frames is a count of the frames of the type and subtype mentioned in the corresponding frame report parameter set with the indicated Transmit Address and BSSID during the measurement duration. The value 255 indicates a count of 255 or more.

In many of the examples provided herein, multicast packets are assumed to be 802.11-compatible. 802.11-compatible is intended to mean the multicast packet can be sent in accordance with, by way of example but not limitation, 802.11a, 802.11b, 802.11g, or other current or future 802.11 standards. It is to be understood that other wireless implementations other than 802.11 will likely have problems that can be reduced using the techniques described herein. Therefore, although the 802.11 standard is ubiquitous, the teachings provided herein are not limited to the 802.11 standard.

Frame report request methodology of, for example, 802.11k can be improved with techniques described herein. The techniques should be applicable to other 802.11 standards and to wireless network techniques in general.

As used herein, a rogue device is a wireless Access-Point or Client device that is violating policies or hampering legal wireless access in a network. The rogue device is often assumed to be harmful for an enterprise network. An interfering device, on the other hand, is a wireless Access-Point or Client device that is coexisting with a legal enterprise network without causing any intentional damage to it. A known device is a wireless Access-Point or Client device that is part of the legal enterprise network wireless installation. A client sensor is a wireless client device that scans 802.11 (or other) channels and provides information to an AP or set of APs.

As used herein, a wireless network refers to any type of wireless network, including but not limited to a structured network or an ad hoc network. Data on a wireless network is often encrypted. However, data may also be sent in the clear, if desired. With encrypted data, a rogue device will have a very difficult time learning any information (such as passwords, etc.) from clients before countermeasures are taken to deal with the rogue. The rogue may be able to confuse the client, and perhaps obtain some encrypted data, but the risk is minimal (even less than for some wired networks).

Active scan involves sending an AP to other channels (for a short time). One well-known problem with active scanning is service disruption. In addition to the short period of time where an AP is not on its primary channel, the switching can cause annoying problems in other respects. For example, when voice is sent over a wireless channel, active scan can cause an audible click when an AP scans another channel.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A method comprising:
    receiving, at a proxy client device, a command from an access point on a first channel;
    forwarding the command from the proxy client device to a client device on the second channel;
    receiving, at the proxy client device and from the client device, a report that is responsive to the command; and
    forwarding the report from the proxy client device to the access point.

2. The method of claim 1, wherein the proxy client device is a non-access point.

3. The method of claim 1, wherein the report includes a frame report frame.

4. The method of claim 1, wherein switching the proxy client to the second channel is in response to the command.

5. The method of claim 1, wherein the report is based on one or more of a channel number, a frame type, and a frame subtype.

6. The method of claim 1, furthering comprising listening on the second channel for a predetermined period of time.

7. The method of claim 1, wherein the receiving includes receiving the command by the access point via a switch.

8. An apparatus, comprising:
    a client device configured to be operatively coupled to a proxy client device that is operatively coupled to an access point,
    the client device configured to receive, from the proxy client device and on a first channel, a command that was received by the proxy client device on a second channel from the access point,
    the client device configured to send a report to the proxy client device on the second channel such that the proxy client device forwards the report to the access point on the first channel.

9. The apparatus of claim 8, wherein the report includes a frame report frame.

10. The apparatus of claim 8, wherein the report is based on one or more of a channel number, a frame type, and a frame subtype.

11. The apparatus of claim 8, wherein:
    the report is a first report,
    the client device is configured to send the first report, at a first time, to the proxy client device,
    the client device is configured to send a second report, at a second time before the first time, to the proxy client device on the second channel such that the proxy client device forwards the second report to the access point on the first channel.

12. The apparatus of claim 8, wherein the proxy client device is a non-access point.

13. The apparatus of claim 8, wherein the command is based on a connectivity outage.

14. The apparatus of claim 8, wherein the client device is configured to send the report to the access point on the first channel.

15. A method, comprising:
    receiving, at a proxy client device at a first time, a first command from an access point on a first channel;
    forwarding the first command from the proxy client device to a client device on a second channel;
    receiving, at the proxy client device and from the client device, a report that is responsive to a second command received at a second time prior to the first time; and
    forwarding the report from the proxy client device to the access point.

16. The method of claim 15, wherein the proxy client device is a non-access point.

17. The method of claim 15, wherein the report includes a frame report frame.

18. The method of claim 15, wherein the report is based on one or more of a channel number, a frame type, and a frame subtype.

19. The method of claim 15, wherein the first command is based on a suspicious network activity trigger and the second command is based on a schedule trigger.

20. The method of claim 15, further comprising forwarding the report from the proxy client device to the access point such that the access point forwards the report to a switch.

* * * * *